United States Patent
Fukaya et al.

(10) Patent No.: US 11,467,378 B2
(45) Date of Patent: *Oct. 11, 2022

(54) IMAGING LENS

(71) Applicant: TOKYO VISIONARY OPTICS CO., LTD., Tokyo (JP)

(72) Inventors: Hisao Fukaya, Sukagawa (JP); Kenichi Kamada, Sukagawa (JP); Shingo Yuza, Sukagawa (JP)

(73) Assignee: TOKYO VISIONARY OPTICS CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/741,413

(22) Filed: Jan. 13, 2020

(65) Prior Publication Data

US 2020/0150397 A1 May 14, 2020

Related U.S. Application Data

(63) Continuation of application No. 15/788,648, filed on Oct. 19, 2017, now Pat. No. 10,534,159.

(30) Foreign Application Priority Data

Oct. 19, 2016 (JP) ................................. 2016-205573
Mar. 29, 2017 (JP) ............................. JP2017-066393

(51) Int. Cl.
  *G02B 13/00* (2006.01)
  *G02B 9/62* (2006.01)
(52) U.S. Cl.
  CPC ........... *G02B 13/0045* (2013.01); *G02B 9/62* (2013.01)

(58) Field of Classification Search
  CPC .............................. G02B 13/0045; G02B 9/62
  (Continued)

(56) References Cited

U.S. PATENT DOCUMENTS 8,854,745 B1   10/2014   Chen
2012/0188654 A1   7/2012   Huang
(Continued)

FOREIGN PATENT DOCUMENTS

CN        105204138 A    12/2015
CN        105824102 A     8/2016
JP       2012-155223 A    8/2012

*Primary Examiner* — James R Greece
(74) *Attorney, Agent, or Firm* — Hamre, Schumann, Mueller & Larson, P.C.

(57) ABSTRACT

There is provided an imaging lens with high-resolution which realizes the low-profileness, wide field of view and low F-value well balance. An imaging lens comprising in order from an object side to an image side, a first lens having positive refractive power, a second lens having negative refractive power, a third lens being a double-sided aspheric lens, a fourth lens having a meniscus shape with a concave surface facing the object side near an optical axis, a fifth lens being a double-sided aspheric lens, and a sixth lens having the concave surface facing the image side near the optical axis, wherein the image-side surface of said sixth lens is an aspheric surface which changes to the convex surface at a peripheral portion, and a total track length is 6.0 mm or less and below conditional expressions (2) and (3) are satisfied:

$$20 < vd3 < 32 \quad (2)$$

$$20 < vd5 < 32 \quad (3)$$

where
vd3: abbe number at d-ray of the third lens
vd5: abbe number at d-ray of the fifth lens.

13 Claims, 16 Drawing Sheets

(58) Field of Classification Search
USPC .................................................. 359/708, 713
See application file for complete search history.

(56) References Cited

U.S. PATENT DOCUMENTS

| | | |
|---|---|---|
| 2012/0243108 A1 | 9/2012 | Tsai et al. |
| 2014/0355134 A1* | 12/2014 | Sekine ................. H05K 999/99 359/713 |
| 2015/0177489 A1 | 6/2015 | Hashimoto |
| 2015/0205071 A1 | 7/2015 | Hashimoto |
| 2015/0260961 A1 | 9/2015 | Ota et al. |
| 2015/0338611 A1 | 11/2015 | Jung et al. |
| 2016/0004048 A1 | 1/2016 | Noda et al. |
| 2016/0116715 A1 | 4/2016 | Ota |
| 2016/0124189 A1 | 5/2016 | Park |
| 2016/0341934 A1 | 11/2016 | Mercado |
| 2017/0307855 A1 | 10/2017 | Lu |
| 2017/0336604 A1 | 11/2017 | Hsu et al. |
| 2017/0371130 A1 | 12/2017 | Huang et al. |
| 2018/0059377 A1 | 3/2018 | Fukaya et al. |
| 2018/0074295 A1 | 3/2018 | Lin et al. |

* cited by examiner

IMAGING LENS

The present application is based on and claims priority of Japanese patent applications No. 2016-205573 filed on Oct. 19, 2016 and No. 2017-066393 filed on Mar. 29, 2017, the entire contents of which are hereby incorporated by reference.

FIELD OF THE INVENTION

The present invention relates to an imaging lens which is configured to form an image of an object on a solid-state image sensor such as a CCD sensor or a C-MOS sensor used in a compact imaging device.

DESCRIPTION OF THE RELATED ART

In recent years, it becomes common that a camera is mounted in many information terminals. An addition of camera function to a smartphone and a mobile phone becomes functional requirement for products. Furthermore, development of products with the camera function is made accordingly.

An imaging lens mounted in such device is required to be small in size and excellent in resolution.

For example, following Patent Documents 1 and 2 disclose such imaging lens comprising 6 lenses.

Patent Document 1 (JP-A-2012-155223) discloses an imaging lens comprising, in order from an object side, a first lens group having positive refractive power, a second lens group having negative refractive power, a third lens group having positive refractive power, a fourth lens group having negative refractive power, a fifth lens group having positive refractive power, and a sixth lens group having negative refractive power.

Patent Document 2 (US2012-0243108A) discloses an imaging lens comprising, in order from an object side, a first lens having positive refractive power and a convex surface facing the object side, a second lens, a third lens, a fourth lens having at least one aspheric surface, a fifth lens having the convex surface facing the object side and a concave surface facing an image side, and a sixth lens having concave surfaces facing both the object side and the image side, and at least one aspheric surface.

In structures of the imaging lens disclosed in the above Patent Documents 1 and 2, even though low-profileness, wide field of view, and low F-value are desired, it is very difficult to realize aberration correction in a peripheral area, therefore excellent optical performance is not obtained.

SUMMARY OF THE INVENTION

The present invention has been made in view of the above problems, and an object of the present invention is to provide an imaging lens with high resolution which realizes low-profileness, wide field of view and low F-value in well balance, and properly corrects aberrations.

Here, low-profile implies that ratio of total track length to diagonal length of the effective imaging plane of the image sensor is smaller than 1.0. Wide field of view implies that the field of view is 70 degrees or more, and low F-value implies brightness having F2.4 or less.

Regarding terms used in the present invention, unless otherwise noted, a convex surface or a concave surface of the lens implies a shape near the optical axis (paraxial portion). Refractive power implies the refractive power near the optical axis (paraxial portion). The total track length is defined as a distance along the optical axis from an object-side surface of an optical element nearest to the object side to the imaging plane. When measurement of total track length is made, thickness of an IR cut filter or a cover glass located between the imaging lens and the imaging plane of the image sensor is regarded as an air.

In order to achieve the above object, an imaging lens according to the present invention comprises in order from an object side to an image side, a first lens having positive refractive power, a second lens having negative refractive power, a third lens as a double-sided aspheric lens, a fourth lens having a meniscus shape with a concave surface facing the object side near an optical axis, a fifth lens as a double-sided aspheric lens, and a sixth lens having the concave surface facing the image side near an optical axis. The image-side surface of the sixth lens is an aspheric surface which changes to the convex surface at a peripheral portion, and a total track length is 6.0 mm or less and below conditional expressions (2) and (3) are satisfied:

$$20 < vd3 < 32 \quad (2)$$

$$20 < vd5 < 32 \quad (3)$$

where
vd3: abbe number at d-ray of the third lens,
vd5: abbe number at d-ray of the fifth lens.

The first lens is configured to have stronger positive refractive power among six lenses of the imaging lens. Thereby, the low-profileness and the wide field of view are ensured.

The second lens properly corrects spherical aberration and chromatic aberration occurred at the first lens.

The third lens is formed as the double-sided aspheric lens, and corrects chromatic aberration on the optical axis, high-level spherical aberration, coma aberration, and field curvature.

The fourth lens is a meniscus lens having the concave surface facing the object side near the optical axis, and corrects chromatic aberration on the optical axis, high-level spherical aberration, coma aberration, and field curvature.

The fifth lens is formed as the double-sided aspheric lens, and formed to help correction of field curvature and distortion, and control of an angle of light ray incident to an image sensor which the sixth lens carries out.

The sixth lens ensures back focus while maintaining low-profileness. Also, the sixth lens is formed as the double-sided aspheric lens, and carries out the correction of the field curvature and distortion, and control of an angle of light ray incident to the image sensor.

The conditional expression (2) is related to an abbe number of the third lens and defines a condition for effectively enabling proper correction of the chromatic aberration on the optical axis. When the conditional expression (2) is satisfied, especially the chromatic aberration on the optical axis is easily corrected.

The conditional expression (3) is related to an abbe number of the fifth lens and defines a condition for effectively enabling proper correction of chromatic aberration of magnification. When the conditional expression (3) is satisfied, especially the chromatic aberration of magnification is easily corrected.

According to the imaging lens having the above structure, if the first to sixth lenses are grouped, such as a first group of the first lens and the second lens, a second group of the third lens, the fourth lens and the fifth lens, and a third group of the sixth lens, composite refractive power of each group is preferably positive, positive and negative. Such power arrangement is effective for controlling the total track length.

According to the imaging lens having the above structure, it is preferable that a below conditional expression (1) is satisfied:

$$0.2 < D56/D23 < 0.8 \quad (1)$$

where

D23: distance along the optical axis from the image-side surface of the second lens to the object-side surface of the third lens, and D56: distance along the optical axis from the image-side surface of the fifth lens to the object-side surface of the sixth lens.

The Conditional expression (1) is related to ratio of a distance between the second lens and the third lens and a distance between the fifth lens and the sixth lens, and defines a condition for effectively enabling easy low-profileness and proper correction of various aberrations. When the total track length is 6.0 mm or less and the conditional expression (1) is satisfied, balance of the distance between the second lens and the third lens and a distance between the fifth lens and the sixth lens is suppressed from being excessively large, and the low-profileness is easily realized. Furthermore, when the conditional expression (1) is satisfied, the third lens, fourth lens and fifth lens of the imaging lens become arrangeable at an appropriate position, and various aberrations can be corrected while maintaining the low-profileness.

Regarding the conditional expression (1), it is more preferable that a below conditional expression (1a) is satisfied.

$$0.24 \le D56/D23 \le 0.65 \quad (1a)$$

According to the imaging lens having the above structure, it is preferable that the object-side surface of the third lens is formed as the convex surface near the optical axis.

The object-side surface of the third lens is formed as the convex surface, thereby the high-level spherical aberration, coma aberration, and field curvature can be appropriately corrected.

According to the imaging lens having the above structure, it is preferable to satisfy a below conditional expression (4):

$$0.9 < vd1/(vd2+vd3) < 1.4 \quad (4)$$

where
vd1: abbe number at d-ray of the first lens,
vd2: abbe number at d-ray of the second lens,
vd3: abbe number at d-ray of the third lens The conditional expression (4) is related to relationship of abbe numbers at d-ray of each of the first lens, the second lens and the third lens, and defines a condition for enabling proper correction of the chromatic aberration on the optical axis. When the conditional expression (4) is satisfied, proper correction of chromatic aberration on the optical axis can be made.

Regarding the conditional expression (4), it is more preferable that a below conditional expression (4a) is satisfied.

$$1.2vd1/(vd2+vd3) < 1.4 \quad (4a)$$

According to the imaging lens having the above structure, it is preferable to satisfy a below conditional expression (5):

$$1.8 < vd4/vd5 < 2.8 \quad (5)$$

where
vd4: abbe number at d-ray of the fourth lens,
vd5: abbe number at d-ray of the fifth lens.

The conditional expression (5) is related to relationship of abbe numbers at d-ray of each of the fourth lens and the fifth lens, and defines a condition for enabling proper correction of the chromatic aberration of magnification. When the conditional expression (5) is satisfied, the proper correction of chromatic aberration of magnification can be made.

Regarding the conditional expression (5), it is more preferable that a below conditional expression (5a) is satisfied.

$$2.1 vd4/vd5 \le 2.6 \quad (5a)$$

According to the imaging lens having the above structure, it is preferable to satisfy a below conditional expression (6):

$$0.1 < D6/\Sigma D < 0.35 \quad (6)$$

where
D6: thickness on the optical axis of the sixth lens, and
$\Sigma D$: a total sum of thickness on the optical axis of each of the first lens, the second lens, the third lens, the fourth lens, the fifth lens and the sixth lens.

The conditional expression (6) is related to the thickness on the optical axis of the sixth lens to the total sum of the thickness on the optical axis from the first to sixth lenses, and defines a condition for effectively enhancing formability and enabling proper correction of the various aberrations. When the conditional expression (6) is satisfied, the thickness of the sixth lens becomes appropriate, and thickness deviation between a center portion and a peripheral portion of the sixth lens becomes relatively small. Thereby, the formability of the sixth lens can be enhanced. Furthermore, the conditional expression (6) is satisfied, the thickness on the optical axis of the first to fifth lenses and each interval therebetween are appropriately determined, and flexibility of the aspherical shape is enhanced. As a result, the various aberrations are properly corrected.

Regarding the conditional expression (6), it is more preferable that a below conditional expression (6a) is satisfied.

$$0.15 \le D6/\Sigma D \le 0.32 \quad (6a)$$

According to the imaging lens having the above structure, it is preferable to satisfy a below conditional expression (7):

$$0.6 < \Sigma_{L1F-L6R}/f < 1.2 \quad (7)$$

Where
$\Sigma_{L1F-L6R}$: distance along an optical axis from the object-side surface of the first lens to the image-side surface of the sixth lens, and
f: focal length of the overall optical system.

The conditional expression (7) is a condition for properly correcting various aberrations while shortening the total track length. If a value is below the upper limit of the conditional expression (7), back focus is ensured and a space for arranging such as a filter is provided. On the other hand, if the value is above the lower limit of the conditional expression (7), it becomes easy to ensure the thickness of each lens for configuring the imaging lens. Furthermore, the interval of lenses each other can be appropriately ensured, and flexibility of the aspherical shape is enhanced. As a result, the various aberrations are properly and easily corrected.

Regarding the conditional expression (7), it is more preferable that a below conditional expression (7a) is satisfied.

$$0.8 \le \Sigma_{L1F-L6R}/f \le 1.1 \quad (7a)$$

According to the imaging lens having the above structure, it is preferable that the first lens is a biconvex lens having convex surfaces facing the object side and the image side near the optical axis, or a meniscus lens having the convex surface facing the object side near the optical axis.

When the first lens is the biconvex lens having the convex surfaces facing the object side and the image side near the optical axis, a position of principal point on the image side of the imaging lens moves to the image side, and it becomes advantage for the wide field of view.

On the other hand, when the first lens is the meniscus lens having the convex surface facing the object side near the optical axis, a position of principal point on the image side of the imaging lens moves to the object side, and it becomes advantage for the low-profileness.

According to the imaging lens having the above structure, it is preferable that the second lens is a biconcave lens having concave surfaces facing the object side and the image side near the optical axis, or a meniscus lens having the concave surface facing the image side near the optical axis.

When the second lens has the concave surface facing the image side near the optical axis and has negative refractive power, light ray emitted from the second lens goes away from the optical axis, and it becomes advantage for the low-profileness of the imaging lens.

When the second lens is the meniscus lens having the concave surface facing the image side near the optical axis, occurrence of the spherical aberration is suppressed, and astigmatism is appropriately corrected.

Additionally, when the second lens is the biconcave lens having concave surfaces facing the object side the image side near the optical axis, occurrence of the spherical aberration is suppressed, and the coma aberration is appropriately corrected.

According to the imaging lens having the above structure, it is preferable that the third lens is a meniscus lens having the convex surface facing the object side near the optical axis. Because of such structure, there is appropriately corrected the chromatic aberration on the optical axis, the high-level spherical aberration, coma aberration, and field curvature. Additionally, the third lens is configured to properly correct mainly the various aberrations by having the aspheric surfaces provided on both surfaces, and the refractive power in terms of the overall optical system is set weak. The aspherical shape of the third lens is formed that the peripheral portions of both surfaces approach to the second lens side. Therefore, the off-axial light ray emitted from the second lens is led to the fourth lens while maintaining a narrow lens interval, and the low-profileness of the imaging lens can be achieved.

Regarding the object-side and the image-side surfaces of the third lens, the third lens is not limited to the meniscus shape having the convex surface facing the object side. If influences to focal length of the overall optical system of the imaging lens or refractive power of each lens are suppressed to be small, there may be used, near the optical axis, a biconvex shape having the convex surfaces facing the object side and the image side, a meniscus shape having the concave surface facing the object side, a biconcave shape having the concave surfaces facing the object side and the image side, a shape having a plane surface facing the object side and the convex or concave surface facing the image side, a shape having the plane surface facing the image side and the convex or concave surface facing the object side, a biplane shape having plane surfaces facing the both sides, and so on.

According to the imaging lens having the above structure, it is preferable that the fourth lens has positive refractive power. When the refractive power of the fourth lens is positive, the positive refractive power of the overall optical system is compensated, and correction of the chromatic aberration on the optical axis, the high-level spherical aberration, coma aberration, and field curvature becomes possible while maintaining the low-profileness.

According to the imaging lens having the above structure, it is preferable that the fifth lens is configured to have biplane surfaces near the optical axis as an optical element having no substantial refractive power near the optical axis. By applying such structure to the fifth lens, the various aberrations such as chromatic aberration of magnification are properly corrected without influencing the focal length of the overall optical system or distribution of the refractive powers of other lenses.

The surfaces of the fifth lens facing the object side and the image side are not limited to the plane surface near the optical axis. If influences to focal length of the overall optical system of the imaging lens or refractive power of each lens are suppressed to be small, there may be used, near the optical axis, a meniscus shape having the convex surface facing the object side, a biconvex shape having the convex surfaces facing the object side and the image side, a meniscus shape having the concave surface facing the object side, a biconcave shape having the concave surfaces facing the object side and the image side, a shape having a plane surface facing the object side and the convex or concave surface facing the image side, a shape having the plane surface facing the image side and the convex or concave surface facing the object side, and so on.

According to the imaging lens having the above structure, it is preferable that the sixth lens has a meniscus shape having the convex surface facing the object side and the concave surface facing the image side near the optical axis. Thereby, the low-profileness is realized and the back focus is ensured. The surface facing the object side of the sixth lens changes from convex to concave as the distance from the axis increases. Moreover, if the aspheric surface is formed which changes to the convex at the peripheral portion, excellent correction of the field curvature and control of a chief ray angle to the image sensor are provided. The sixth lens may have a plane or concave surface facing the object side near the optical axis.

According to the imaging lens having the above structure, it is preferable that a below conditional expressions (8) and (9) are satisfied:

$$0.8<|r3|/f<15.0 \qquad (8)$$

$$0.4<r4/f<2.8 \qquad (9)$$

where r3: curvature radius near an optical axis of the object-side surface of the second lens, r4: curvature radius near an optical axis of the image-side surface of the second lens, and f: a focal length of the overall optical system.

The conditional expressions (8) and (9) are related to the shape near the optical axis of the second lens and define conditions for effectively enabling proper correction of aberration and reduction of manufacturing error. When the conditional expressions (8) and (9) are satisfied, refractive power of the object-side surface and the image-side surface is suppressed to be excessive, and proper correction of aberration is made. Also, the conditional expressions (8) and (9) are the conditions for reducing the manufacturing error of the second lens.

Regarding the conditional expressions (8) and (9), it is more preferable that below conditional expressions (8a) and (9a) are satisfied.

$$0.9 \leq |r3|/f \leq 12 \quad (8a)$$

$$0.4 < r4/f \leq 2.0 \quad (9a)$$

According to the imaging lens having the above structure, it is preferable that below conditional expressions (10) and (11) are satisfied:

$$0.4 < |r11|/f < 2.5 \quad (10)$$

$$0.1 < r12/f < 0.5 \quad (11)$$

where
r11: curvature radius near an optical axis of the object-side surface of the sixth lens,
r12: curvature radius near an optical axis of the image-side surface of the sixth lens, and
f: a focal length of the overall optical system.

The conditional expressions (10) and (11) are related to the shape near the optical axis of the sixth lens and define conditions for effectively ensuring the back focus and enabling the low-profileness. When the conditional expressions (10) and (11) are satisfied, the low-profileness is maintained while ensuring appropriate back focus.

Regarding the conditional expressions (10) and (11), it is more preferable that below conditional expressions (10a) and (11a) are satisfied.

$$0.45 \leq |r11|/f \leq 2.3 \quad (10a)$$

$$0.15 \leq r12/f \leq 0.4 \quad (11a)$$

According to the imaging lens having the above structure, it is preferable that a below conditional expression (12) is satisfied:

$$0.1 < D34/D23 < 1.5 \quad (12)$$

where
D23: distance along the optical axis from the image-side surface of the second lens to the object-side surface of the third lens, and
D34: distance along the optical axis from the image-side surface of the third lens and the object-side surface of the fourth lens.

The Conditional expression (12) is related to ratio of a distance between the second lens and the third lens and a distance between the third lens and the fourth lens, and defines a condition for effectively enabling the low-profileness and correction of various aberrations. When the conditional expression (12) is satisfied, balance of a distance between the second lens and the third lens and a distance between the third lens and the fourth lens is suppressed from being large, and the low-profileness is enabled. Furthermore, when the conditional expression (12) is satisfied, the third lens is arranged at an appropriate position, and function of correcting various aberrations by the lens becomes effective.

Regarding the conditional expression (12), it is more preferable that a below conditional expression (12a) is satisfied.

$$0.2 \leq D34/D23 \leq 1.2 \quad (12a)$$

According to the imaging lens having the above structure, it is preferable that below conditional expressions (13) and (14) are satisfied:

$$0.5 < f1/f < 1.5 \quad (13)$$

$$0.5 < f4/f < 4.0 \quad (14)$$

where
f1: focal length of the first lens,
f4: focal length of the fourth lens, and
f: focal length of the overall optical system of the imaging lens.

The conditional expression (13) is related to the focal length of the first lens to the focal length of the overall optical system, and the conditional expression (14) is related to the focal length of the fourth lens to the focal length of the overall optical system, and these conditional expressions define conditions for effectively enabling to ensure the back focus and the low-profileness. When the conditional expressions (13) and (14) are satisfied, the low-profileness is enabled while ensuring the appropriate back focus.

Regarding the conditional expressions (13) and (14), it is more preferable that below conditional expressions (13a) and (14a) are satisfied.

$$0.6 \leq f1/f \leq 1.2 \quad (13a)$$

$$0.6 \leq f4/f \leq 3.0 \quad (14a)$$

According to the imaging lens having the above structure, it is preferable that a below conditional expression (15) is satisfied:

$$-0.4 < f2/f < -1.0 \quad (15)$$

where
f2: focal length of the second lens, and
f: focal length of the overall optical system of the imaging lens.

The conditional expression (15) is related to the focal length of the second lens to the focal length of the overall optical system, and defines condition for effectively enabling to reduce the manufacturing error sensitivity and to properly correct the coma aberration and distortion. If the refractive power of the second lens is not unnecessarily large, and is not unnecessarily small, the proper correction of the coma aberration and the distortion at the peripheral portion can be made while reducing the manufacturing error sensitivity.

Regarding the conditional expression (15), it is more preferable that a below conditional expression (15a) is satisfied.

$$-3.5 \leq f2/f \leq -1.2 \quad (15a)$$

According to the imaging lens having the above structure, it is preferable that a below conditional expression (16) is satisfied:

$$-2.0 < f6/f < -0.5 \quad (16)$$

where
f6: focal length of the sixth lens, and
f: focal length of the overall optical system of the imaging lens.

The conditional expression (16) is related to the focal length of the sixth lens to the focal length of the overall optical system, and defines a condition for effectively enabling to ensure the back focus. When the conditional expression (16) is satisfied, the back focus is appropriately controlled and secures 20% or more of the total track length.

Regarding the conditional expression (16), it is more preferable that a below conditional expression (16a) is satisfied.

$$-1.5 \leq f6/f \leq -0.6 \quad (16a)$$

According to the imaging lens having the above structure, it is preferable that a below conditional expression (17) is satisfied:

$$|f2|>|f6| \qquad (17)$$

where f2: focal length of the second lens, and
f6: focal length of the sixth lens.

According to the imaging lens having the above structure, it is preferable that a below conditional expression (18) is satisfied:

$$2.0<|f3|/f \qquad (18)$$

where f3: focal length of the third lens, and
f: focal length of the overall optical system of the imaging lens.

The conditional expression (18) is related to the focal length of the third lens to the focal length of the overall optical system, and defines a condition for effectively enabling to shorten the total track length and to properly correct the various aberrations. If a value is above the lower limit of the conditional expression (18), the chromatic aberration is corrected, the total track length is shortened and the coma aberration is properly corrected.

Regarding the conditional expression (18), it is more preferable that a below conditional expression (18a) is satisfied.

$$2.5 \le |f3|/f \le 100 \qquad (18a)$$

According to the imaging lens having the above structure, an aperture stop is located at the object side of the first lens, and it is preferable that a below conditional expression (19) is satisfied:

$$1.5<\Sigma_{L1F-L6R}/EPD<2.16 \qquad (19)$$

where

EPD: diameter of the aperture stop, and
$\Sigma_{L1F-L6R}$: distance along the optical axis from the object-side surface of the first lens to the image-side surface of the sixth lens.

The aperture stop is located at the object side of the first lens, an entrance pupil position goes away from the image surface, and control of an angle of light ray incident to the image sensor and telecentricity become facilitated. The conditional expression (19) is a condition for enabling the low-profileness and low F-number. When the conditional expression (19) is satisfied, the imaging lens is provided which has enough low-profileness and brightness.

Regarding the conditional expression (19), it is more preferable that a below conditional expression (19a) is satisfied.

$$1.65 \le \Sigma_{L1F-L6R}/EPD \le 2.0 \qquad (19a)$$

According to the imaging lens having the above structure, it is preferable that a below conditional expression (20) is satisfied:

$$0.1<D56/D6<0.7 \qquad (20)$$

where

D56: distance along the optical axis from the image-side surface of the fifth lens to the object-side surface of the sixth lens, and
D6: thickness of the optical axis of the sixth lens.

The conditional expression (20) is related to ratio of the distance between the fifth lens and the sixth lens and the thickness of the sixth lens, and defines a condition for effectively enabling easy low-profileness and proper correction of various aberrations. When the conditional expression (20) is satisfied, balance of the distance between the fifth lens and the sixth lens and the thickness of the sixth lens is suppressed from being excessively large, and the low-profileness is easily realized. Furthermore, when the conditional expression (20) is satisfied, the sixth lens of the imaging lens becomes arrangeable at an appropriate position, and various aberrations can be corrected while maintaining the low-profileness.

Regarding the conditional expression (20), it is more preferable that a below conditional expression (20a) is satisfied.

$$0.13<D56/D6<0.65 \qquad (20a)$$

According to the present invention, there can be provided an imaging lens with high resolution which realizes low-profileness, a wide field of view and low F-value in well balance.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11, 13 and 15 are schematic views showing the general configurations of the imaging lenses in Examples 1 to 8 according to the embodiments of the present invention, respectively. Since all these examples have the same basic lens configuration, the general configuration of an imaging lens according to this embodiment is explained below mainly referring to the schematic view of Example 1.

Figure 1:
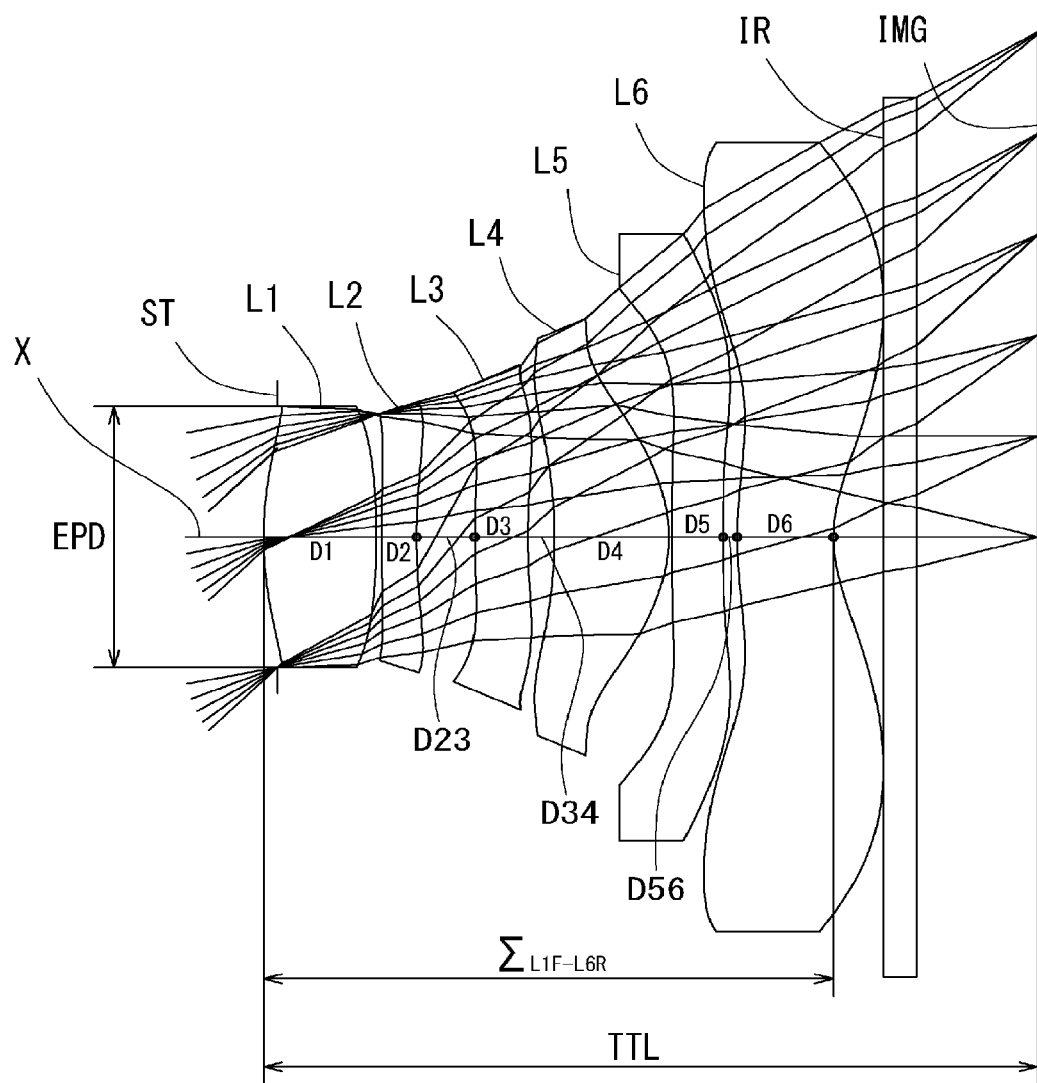
FIG. 1 is a schematic view showing a general configuration of an imaging lens in Example 1 according to the present invention.

As shown in FIG. 1, the imaging lens according to this embodiment comprises in order from an object side to an image side, a first lens L1 having positive refractive power, a second lens L2 having negative refractive power, a third lens L3 of a double-sided aspheric lens, a forth lens L4 having a meniscus shape with a concave surface facing the object side near an optical axis, a fifth lens L5 of the double-sided aspheric lens, and a sixth lens L6 having a concave surface facing the image side near the optical axis. The image-side surface of the sixth lens L6 has an aspheric surface which changes to the convex toward the image side at the peripheral portion. An aperture stop ST is located at the object side of the first lens. It is preferable that total track length (TTL) is in a range of 3.5 mm to 6.0 mm, and in the embodiment 1, the TTL is defined as 4.75 mm.

A filter IR such as an IR cut filter or a cover glass is located between the sixth lens L6 and an image plane IMG (namely, an image plane of the image sensor). The filter IR is omissible.

The first lens L1 is configured to have stronger positive refractive power among six lenses of the imaging lens. Thereby, the low-profileness and the wide field of view are ensured.

Figure 3:
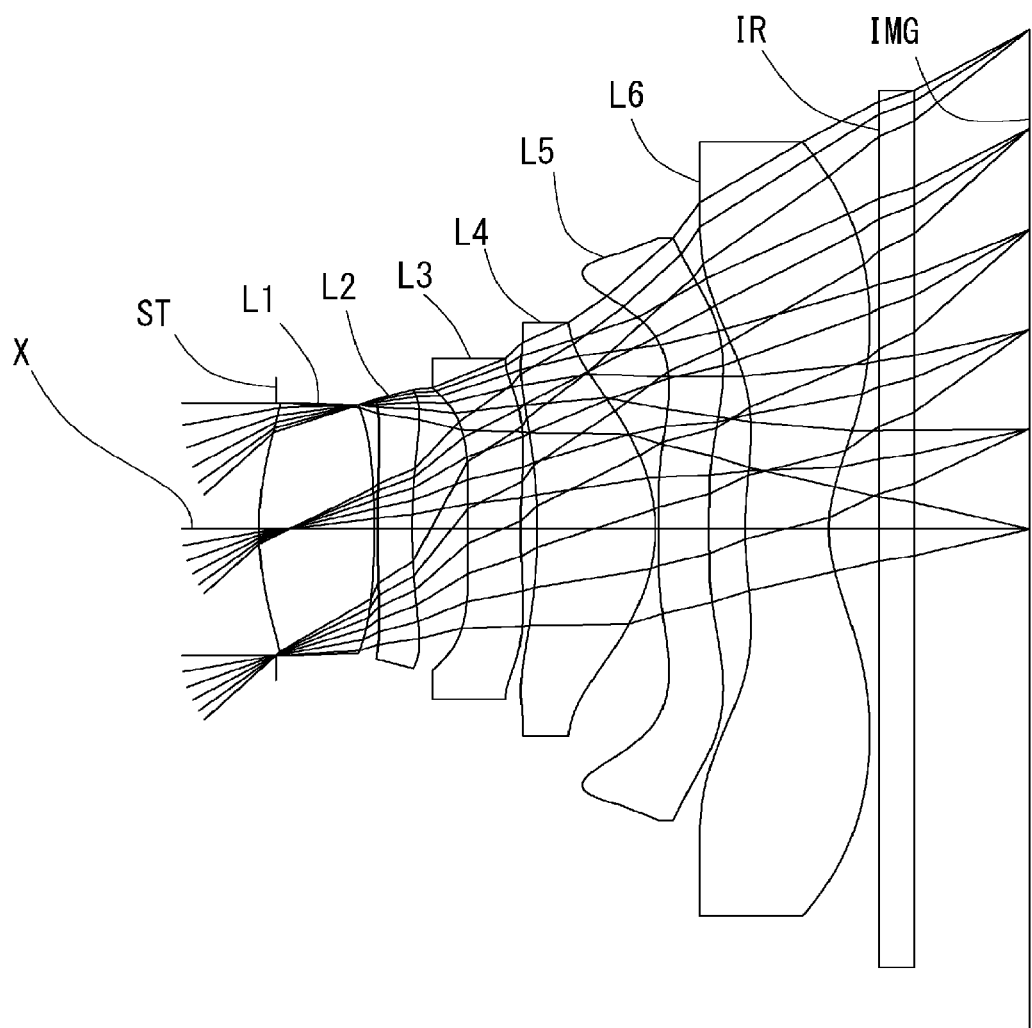
FIG. 3 is a schematic view showing the general configuration of an imaging lens in Example 2 according to the present invention.
Figure 5:
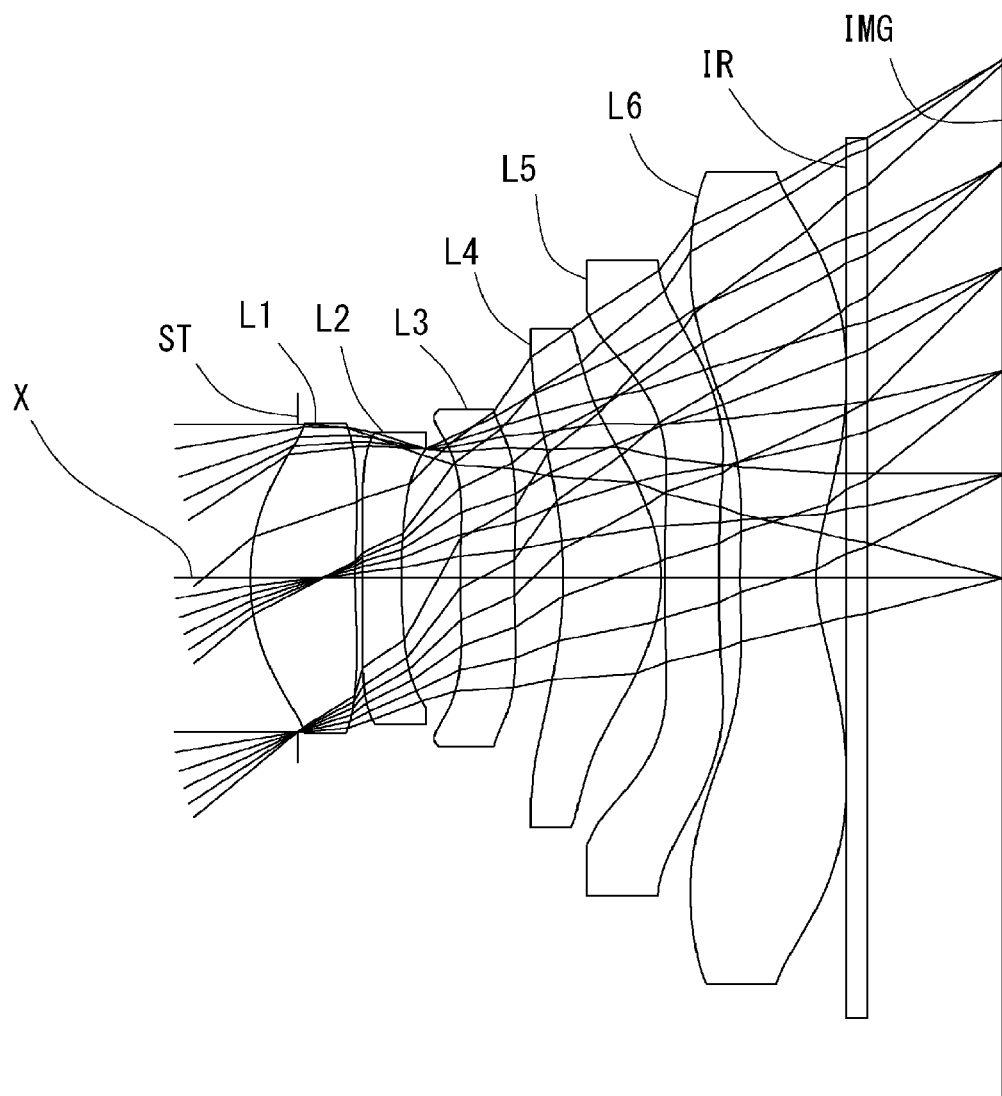
FIG. 5 is a schematic view showing the general configuration of an imaging lens in Example 3 according to the present invention.
Figure 7:
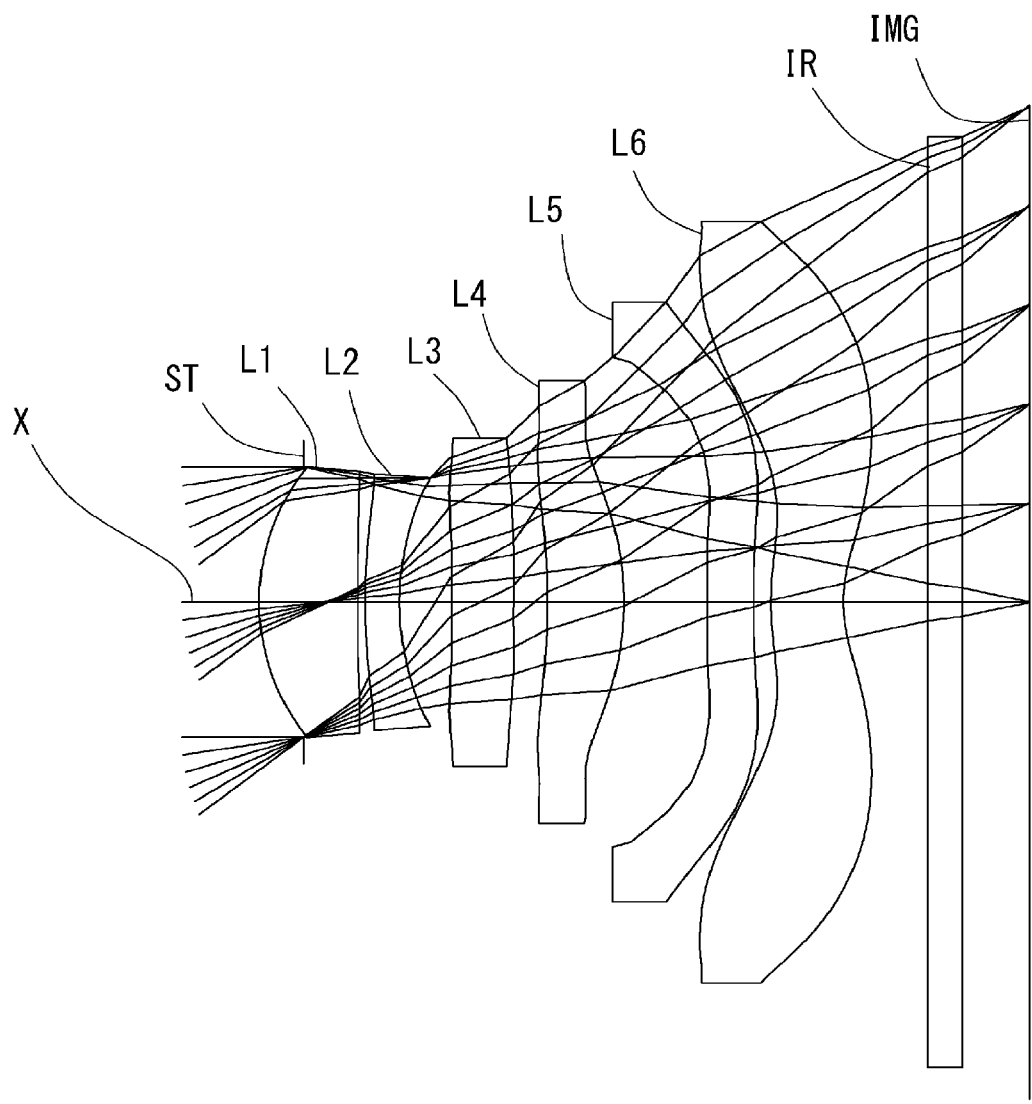
FIG. 7 is a schematic view showing the general configuration of an imaging lens in Example 4 according to the present invention.
Figure 9:
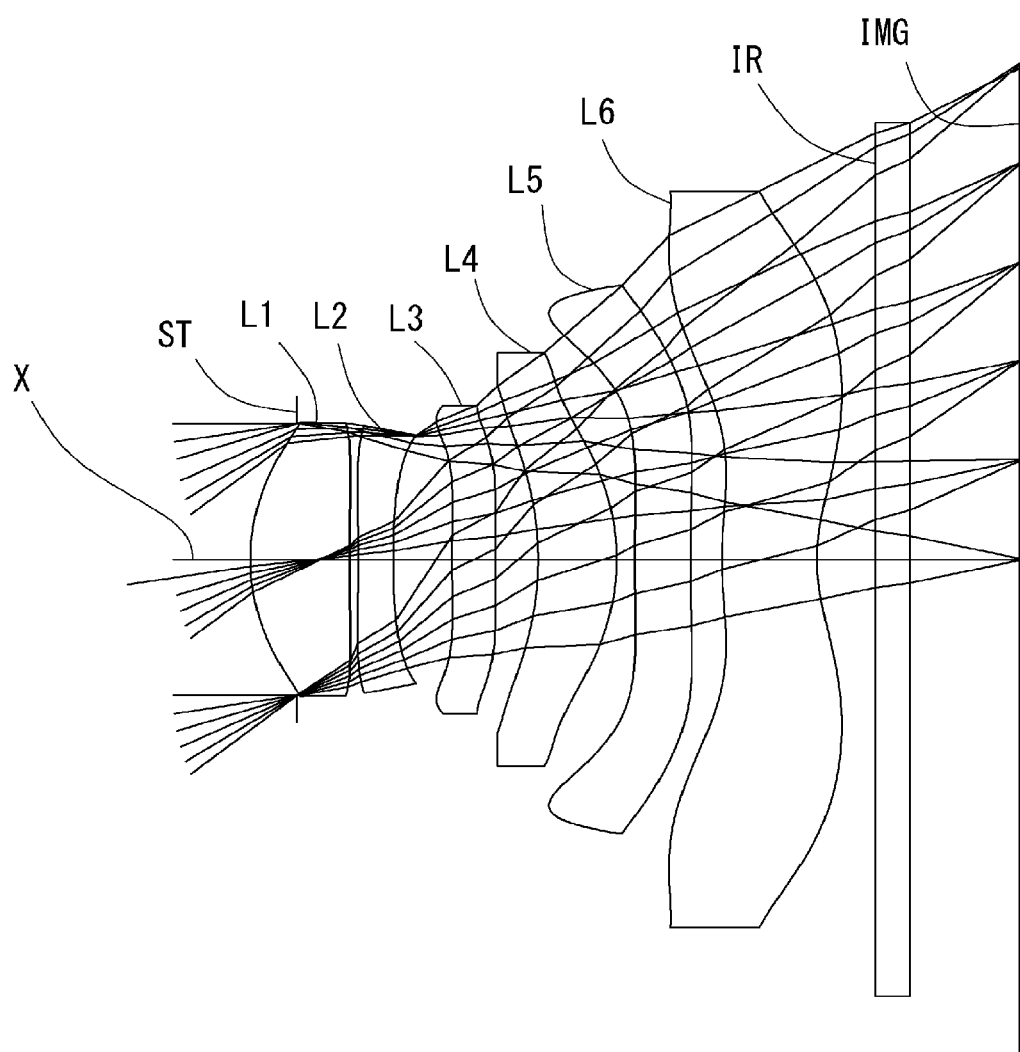
FIG. 9 is a schematic view showing the general configuration of an imaging lens in Example 5 according to the present invention.
Figure 11:
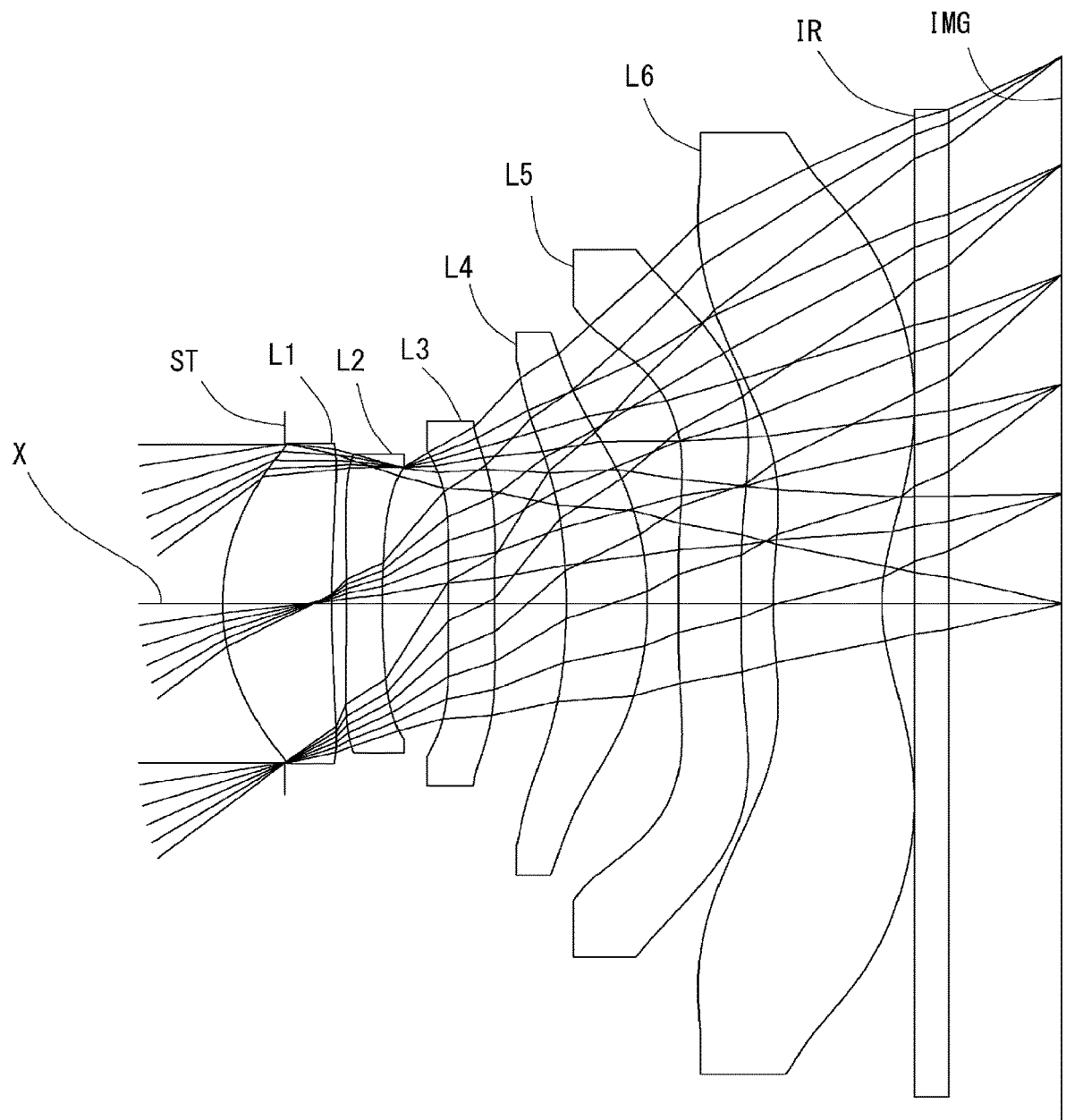
FIG. 11 is a schematic view showing the general configuration of an imaging lens in Example 6 according to the present invention.
Figure 13:
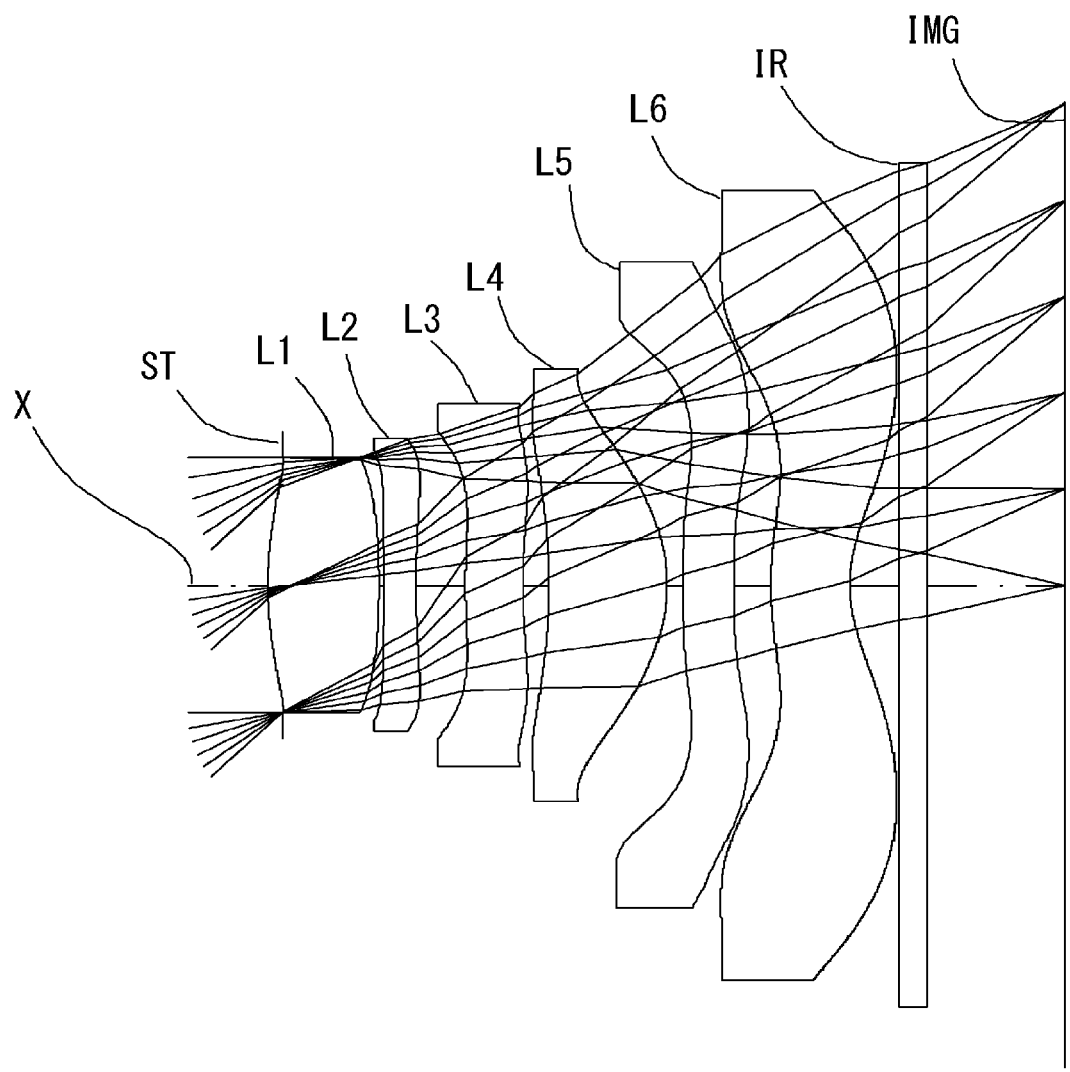
FIG. 13 is a schematic view showing the general configuration of an imaging lens in Example 7 according to the present invention.
Figure 15:
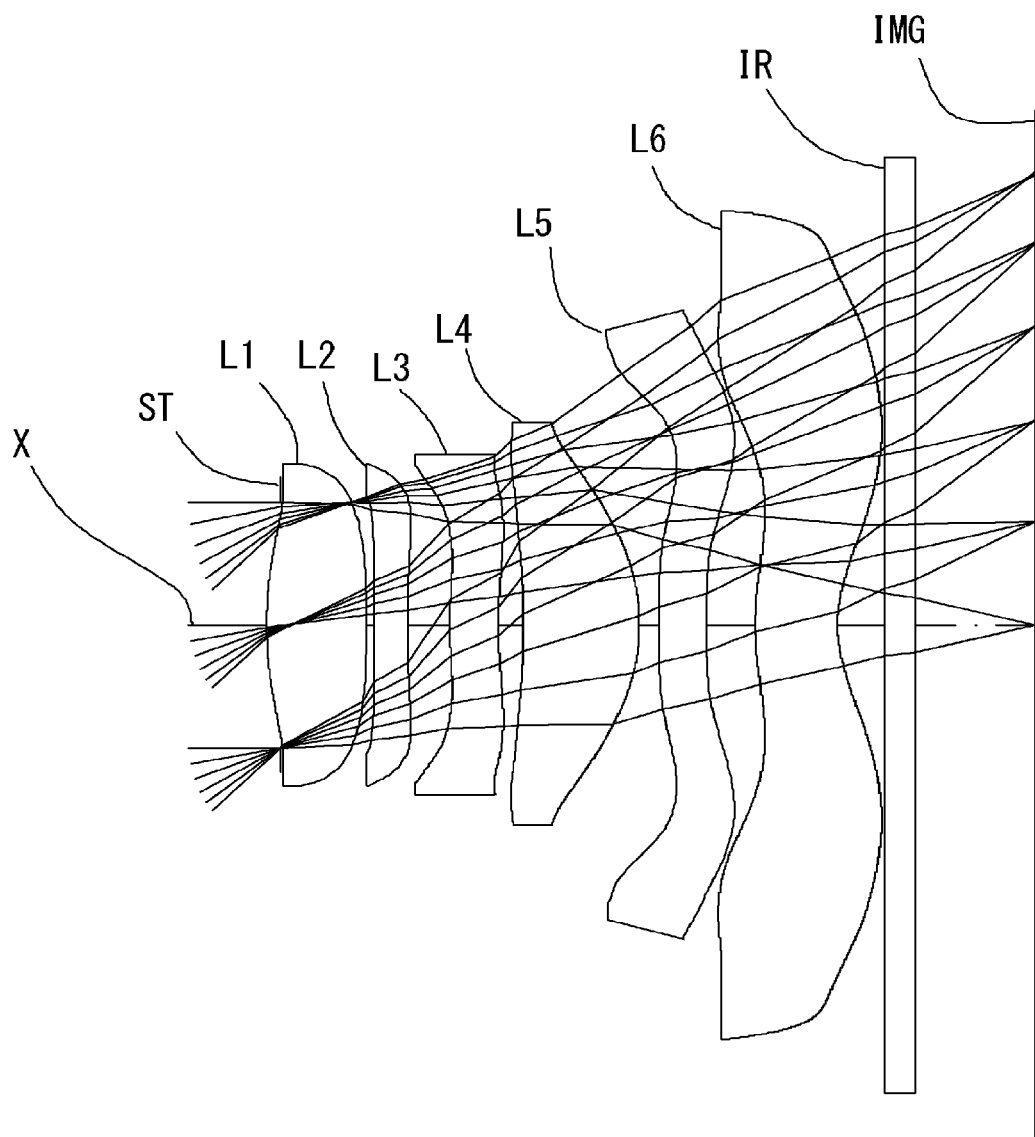
FIG. 15 is a schematic view showing the general configuration of an imaging lens in Example 8 according to the present invention.

The first lens L1 is configured to be a bi-convex lens having convex surfaces facing the object side and the image side near the optical axis, or a meniscus lens having the convex surface facing the object side near the optical axis. The embodiment 1 as shown in FIG. 1, the embodiment 2 as shown in FIG. 3, the embodiment 7 as shown in FIG. 13, and the embodiment 8 as shown in FIG. 15 are examples of the biconvex lens having the convex surfaces facing the object side and the image side near the optical axis. In this case, a position of principal point on the image side of the imaging lens moves to the image side, and it becomes advantage for the wide field of view. An embodiment 3 as shown in FIG. 5, an embodiment 4 as shown in FIG. 7, an embodiment 5 as shown in FIG. 9, and an embodiment 6 as shown in FIG. 11 are examples of the meniscus lens of the first lens L1 having the convex surface facing the object side near the optical axis X. In this case, a position of principal point on the image side of the imaging lens moves to the object side, and it becomes advantage for the low-profileness.

The second lens L2 properly corrects spherical aberration and chromatic aberration occurred at the first lens L1. A shape of the second lens L2 is a biconcave shape having concave surfaces facing the object side and the image side near the optical axis X, or the meniscus shape having the concave surface facing the image side near the optical axis X. The embodiments 1, 2, 3, 4, 7 and 8 are examples of the meniscus shape of the second lens L2 having the concave surface facing the image side near the optical axis X, and occurrence of the spherical aberration is suppressed and astigmatism is appropriately corrected. The embodiments 5 and 6 are the examples of the biconcave shape of the second lens L2 having the concave surfaces facing the object side and the image side near the optical axis X, and occurrence of the spherical aberration is suppressed and coma aberration is appropriately corrected.

The third lens L3 is formed as double-sided aspheric lens, and corrects chromatic aberration on the optical axis, high-level spherical aberration, coma aberration, and field curvature. A shape of the third lens L3 is the meniscus shape having the convex surface facing the object side near the optical axis X, and these aberrations are appropriately corrected. The third lens L3 is configured to correct aberrations and have negative refractive power which is weak to refractive power of the overall optical system. The embodiments 1, 2 7 and 8 are the examples to have the weak negative refractive power, and the embodiments 3, 4, 5 and 6 are the examples to have the weak positive refractive power. The aspherical shape of the third lens L3 is that the both surfaces at the peripheral portion approach the second lens L2. Therefore, an off-axial light ray emitted from the second lens L2 can be guided to the fourth lens L4 while maintaining narrow distance of lenses, and the third lens L3 contributes the low-profileness of the imaging lens.

The fourth lens L4 has a meniscus shape having a concave surface facing the object side near the optical axis X, and corrects the chromatic aberration on the optical axis, the high-level spherical aberration, the coma aberration, and the field curvature. The fourth lens L4 is a double-sided aspheric lens, and appropriately correct these aberrations. The fourth lens L4 has positive refractive power, and compensates the positive refractive power of the overall optical system and the low-profileness is maintained.

The fifth lens L5 is formed as the double-sided aspheric lens, and formed to help correction of field curvature and distortion, control of an angle of light ray incident to an image sensor, and correction of chromatic aberration of magnification which the sixth lens L6 carries out. The fifth lens L5 has plane surfaces facing the object side and the image side near the optical axis X and functions for aberration correction without substantial refractive power near the optical axis. By applying such structure to the fifth lens, the various aberrations are properly corrected without influencing the focal length of the overall optical system or distribution of the refractive powers of other lenses. The surfaces of the fifth lens facing the object side and the image side are not limited to the plane surface near the optical axis. If influences to the focal length of the overall optical system of the imaging lens or refractive power of each lens are suppressed to be small, there may be used, near the optical axis, a meniscus shape having the convex surface facing the object side, a biconvex shape having the convex surfaces facing the object side and the image side, a meniscus shape having the concave surface facing the object side, a biconcave shape having the concave surfaces facing the object side and the image side, a shape having a plane surface facing the object side and the convex or concave surface facing the image side, a shape having the plane surface facing the image side and the convex or concave surface facing the object side, and so on.

The sixth lens L6 ensures back focus while maintaining the low profileness. Additionally, the sixth lens L6 is the double-sided aspheric lens and therefore, corrects the field curvature and distortion, and controls the angle of light ray incident to the image sensor. A shape of the sixth lens L6 has a meniscus shape having the convex surface facing the object side and the concave surface facing the image side near the optical axis X. Thereby, the low-profileness and the back focus are ensured. The object-side surface of the sixth lens L6 changes from convex to concave as the distance from the axis X increases. Moreover, the aspheric surface is formed which changes to the convex at the peripheral portion, and there are properly provided correction of the field curvature and control of a chief ray angle to the image sensor.

According to the imaging lens of the present embodiments, if the first to sixth lenses are grouped, such as a first group of the first lens L1 and the second lens L2, a second group of the third lens L3, fourth lens L4 and fifth lens L5, and a third group of the sixth lens L6, composite refractive power of each group is preferably positive, positive and negative. Such power arrangement makes easy to shorten the total track length. Additionally, the aperture stop ST is located at the object side of the first lens L1, an entrance pupil position goes away from the image surface, and control of the angle of light ray incident to the image sensor and telecentricity become facilitated. Conditional expressions (a), (b), and (c) are satisfied, $$1.0 < f12/f < 1.9 \quad (a)$$

$$0.8 < f345/f < 2.8 \quad (b)$$

$$0.4 < f12/f345 < 1.85 \quad (c)$$

where
f12: composite focal length of the first group, and
f345: composite focal length of the second group.

The imaging lens according to the present embodiments satisfies the below conditional expressions (1) to (20).

$$0.2 < D56/D23 < 0.8 \quad (1)$$

$$20 < vd3 < 32 \quad (2)$$

$$20 < vd5 < 32 \quad (3)$$

$$0.9 < vd1/(vd2+vd3) < 1.4 \quad (4)$$

$$1.8 < vd4/vd5 < 2.8 \quad (5)$$

$$0.1 < D6/\Sigma D < 0.35 \quad (6)$$

$$0.6 < \Sigma_{L1F-L6R}/f < 1.2 \quad (7)$$

$$0.8 < |r3|/f < 15.0 \quad (8)$$

$$0.4 < r4/f < 2.8 \quad (9)$$

$$0.4 < |r11|/f < 2.5 \quad (10)$$

$$0.1 < r12/f < 0.5 \quad (11)$$

$$0.1 < D34/D23 < 1.5 \quad (12)$$

$$0.5 < f1/f < 1.5 \quad (13)$$

$$0.5 < f4/f < 4.0 \quad (14)$$

$$-0.4 < f2/f < -1.0 \quad (15)$$

$$-2.0 < f6/f < -0.5 \quad (16)$$

$$|f2| > |f6| \quad (17)$$

$$2.0 < |f3|/f \quad (18)$$

$$1.5 < \Sigma_{L1F-L6R}/EPD < 2.15 \quad (19)$$

$$0.1 < D56/D6 < 0.7 \quad (20)$$

where
D23: distance along the optical axis from the image-side surface of the second lens to the object-side surface of the third lens,
D34: distance along the optical axis from the image-side surface of the third lens and the object-side surface of the fourth lens,
D56: distance along the optical axis from the image-side surface of the fifth lens to the object-side surface of the sixth lens,
vd1: abbe number at d-ray of the first lens,
vd2: abbe number at d-ray of the second lens,
vd3: abbe number at d-ray of the third lens,
vd4: abbe number at d-ray of the fourth lens,
vd5: abbe number at d-ray of the fifth lens,
D6: thickness on the optical axis of the sixth lens,
$\Sigma D$: a total sum of thickness on the optical axis of each of the first lens, the second lens, the third lens, the fourth lens, the fifth lens and the sixth lens,
$\Sigma_{L1F-L6R}$: distance along an optical axis from the object-side surface of the first lens to the image-side surface of the sixth lens,
r3: curvature radius near an optical axis of the object-side surface of the second lens,
r4: curvature radius near an optical axis of the image-side surface of the second lens,
r11: curvature radius near an optical axis of the object-side surface of the sixth lens,
r12: curvature radius near an optical axis of the image-side surface of the sixth lens,
f1: focal length of the first lens,
f2: focal length of the second lens,
f3: focal length of the third lens,
f4: focal length of the fourth lens,
f6: focal length of the sixth lens,
f: focal length of the overall optical system of the imaging lens, and
EPD: diameter of the aperture stop.

In the imaging lens according to the present embodiment, it is preferable to satisfy all of conditional expressions. By satisfying the conditional expression individually, operational advantage corresponding to each conditional expression can be obtained.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data of Example 1 is shown below in Table 1.

Example 1

| | |
|---|---|
| Unit | mm |
| f = | 3.46 |
| Fno = | 2.0 |
| ω(°) = | 45.0 |
| ih = | 3.43 |
| TTL = | 4.75 |

Surface Data

| Surface Number i | Curvature Radius r | Surface Distance d | Refractive Index Nd | Abbe Number υd |
|---|---|---|---|---|
| (Object ) | Infinity | Infinity | | |
| 1 (Stop) | Infinity | −0.0892 | | |
| 2* | 2.5275 | 0.7037 | 1.544 | 55.86 (υd1) |
| 3* | −7.8271 | 0.0306 | | |
| 4* | 8.6825 | 0.2200 | 1.650 | 21.54 (υd2) |
| 5* | 3.9874 | 0.3606 | | |
| 6* | 5.2535 | 0.3310 | 1.650 | 21.54 (υd3) |
| 7* | 4.4075 | 0.1666 | | |
| 8* | −2.8941 | 0.7096 | 1.535 | 55.66 (υd4) |
| 9* | −1.1305 | 0.0200 | | |
| 10* | Infinity | 0.3200 | 1.650 | 21.54 (υd5) |
| 11* | Infinity | 0.0872 | | |
| 12* | 3.0336 | 0.5987 | 1.535 | 55.66 (υd6) |
| 13* | 1.0235 | 0.3101 | | |
| 14 | Infinity | 0.2100 | 1.535 | 55.66 |
| 15 | Infinity | 0.7565 | | |
| Image Plane | Infinity | | | |

Constituent Lens Data

| Lens | Start Surface | Focal Length | Composity Focal Length | |
|---|---|---|---|---|
| 1 | 2 | 3.596 | f12 | 4.836 |
| 2 | 4 | −11.552 | f345 | 3.269 |
| 3 | 6 | −49.759 | | |
| 4 | 8 | 3.042 | | |
| 5 | 10 | Infinity | Aperture Stop Diameter | |
| 6 | 12 | −3.223 | EPD | 1.772 |

Aspheric Surface Data

| | Second Surface | Third Surface | Fourth Surface | Fifth Surface | Sixth Surface | Seventh Surface |
|---|---|---|---|---|---|---|
| k | −2.148802E+00 | 0.000000E+00 | 0.000000E+00 | −4.706963E+01 | −1.274885E+01 | 0.000000E+00 |
| A4 | −2.887821E−02 | −2.733741E−01 | −2.889923E−01 | −6.086739E−02 | −2.007774E−01 | −8.179784E−02 |
| A6 | 3.026424E−02 | 7.796026E−01 | 9.249086E−01 | 1.908483E−01 | −1.717906E−01 | −3.213358E−01 |
| A8 | −1.374101E−01 | −1.538486E+00 | −1.554286E+00 | −2.840034E−01 | 5.950494E−01 | 6.395106E−01 |
| A10 | 1.377095E−01 | 1.412076E+00 | 8.326769E−01 | −7.892814E−02 | −1.065910E+00 | −7.332953E−01 |
| A12 | −7.015731E−02 | −5.160880E−01 | 3.955885E−01 | 2.289272E−01 | 9.954069E−01 | 4.987250E−01 |
| A14 | 0.000000E+00 | 0.000000E+00 | −4.874620E−01 | −1.157822E−01 | −5.359733E−01 | −1.689457E−01 |
| A16 | 0.000000E+00 | 0.000000E+00 | 0.000000E+00 | 0.000000E+00 | 1.535226E−01 | 2.386488E−02 |

| | Eighth Surface | Ninth Surface | Tenth Surface | Eleventh Surface | Twelfth Surface | Thirteenth Surface |
|---|---|---|---|---|---|---|
| k | 2.344877E+00 | −3.337037E+00 | 0.000000E+00 | 0.000000E+00 | 1.040152E−01 | −4.825857E+00 |
| A4 | 1.593138E−01 | −1.137373E−01 | 1.142899E−01 | 2.032060E−01 | −1.580853E−01 | −9.625450E−02 |
| A6 | −2.971160E−01 | 6.022854E−02 | −1.856793E−01 | −2.708022E−01 | 1.057566E−02 | 3.561953E−02 |
| A8 | 3.381519E−01 | −7.478688E−02 | 1.028382E−01 | 1.547547E−01 | 1.965436E−02 | −7.672820E−03 |
| A10 | −1.539021E−01 | 1.264111E−01 | −3.061701E−02 | −5.158520E−02 | −7.828849E−03 | 7.510134E−04 |
| A12 | 3.868724E−02 | −6.792372E−02 | 2.041302E−03 | 1.038296E−02 | 1.333440E−03 | −1.266426E−07 |
| A14 | −1.303166E−02 | 1.304963E−02 | 1.247246E−03 | −1.169341E−03 | −1.112773E−04 | −5.698958E−06 |
| A16 | 3.246073E−03 | −5.857932E−04 | −2.256971E−04 | 5.644330E−05 | 3.724387E−06 | 3.187182E−07 |

The imaging lens in Example 1 satisfies conditional expressions (1) to (20) as shown in Table 9.

Figure 2:
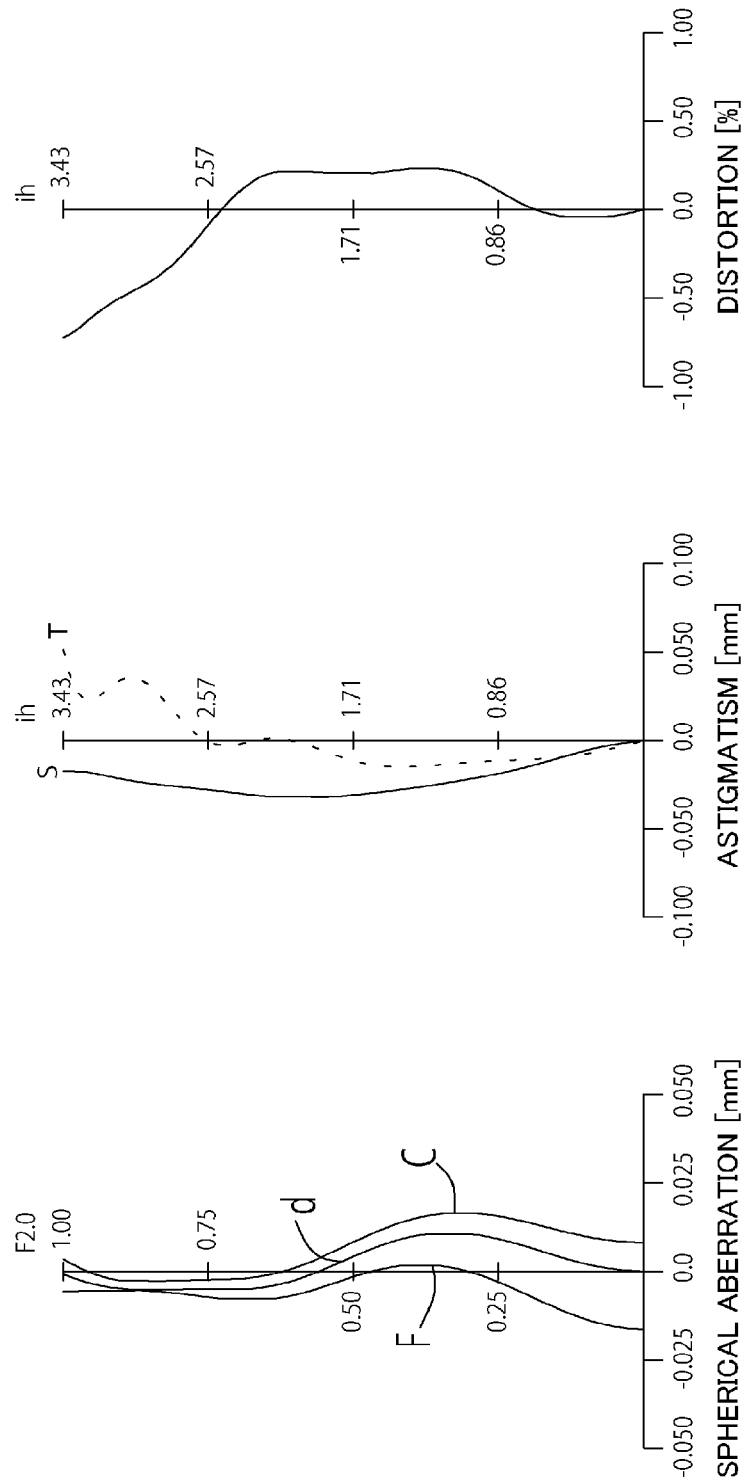
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T (same as FIG. 4, FIG. 6, FIG. 8, FIG. 10, FIG. 12, FIG. 14 and FIG. 16). As shown in FIG. 2, each aberration is corrected properly.

EXAMPLE 2

The basic lens data of Example 2 is shown below in Table 2.

Example 2

| Unit mm |
|---|
| f = 3.37 |
| Fno = 2.1 |
| ω(°) = 44.5 |
| ih = 3.26 |
| TTL = 4.53 |

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.1000 | | |
| 2* | 2.2021 | 0.6890 | 1.544 | 55.86 (νd1) |
| 3* | −6.0931 | 0.0200 | | |
| 4* | 17.4023 | 0.2050 | 1.650 | 21.54 (νd2) |
| 5* | 4.2490 | 0.3332 | | |
| 6* | 12.1208 | 0.3137 | 1.650 | 21.54 (νd3) |
| 7* | 4.0106 | 0.1000 | | |
| 8* | −5.2132 | 0.7059 | 1.535 | 55.66 (νd4) |
| 9* | −1.1775 | 0.0200 | | |
| 10* | Infinity | 0.3000 | 1.614 | 25.58 (νd5) |
| 11* | Infinity | 0.2152 | | |
| 12* | 2.5812 | 0.4978 | 1.535 | 55.66 (νd6) |
| 13* | 0.9545 | 0.5000 | | |
| 14 | Infinity | 0.2100 | 1.535 | 55.66 |
| 15 | Infinity | 0.4916 | | |
| Image Plane | Infinity | | | |

Constituent Lens Data

| Lens | Start Surface | Focal Length | Composity Focal Length | |
|---|---|---|---|---|
| 1 | 2 | 3.061 | f12 | 4.323 |
| 2 | 4 | −8.698 | f345 | 3.464 |
| 3 | 6 | −9.359 | | |
| 4 | 8 | 2.681 | | |
| 5 | 10 | Infinity | Aperture Stop Diameter | |
| 6 | 12 | −3.170 | EPD | 1.630 |

Aspheric Surface Data

| | Second Surface | Third Surface | Fourth Surface | Fifth Surface | Sixth Surface | Seventh Surface |
|---|---|---|---|---|---|---|
| k | −9.657271E−01 | 0.000000E+00 | 0.000000E+00 | −6.876032E+01 | −2.261210E+01 | 0.000000E+00 |
| A4 | −2.346426E−02 | −8.715644E−02 | −6.631431E−02 | 3.169641E−02 | −3.406713E−01 | −3.959456E−01 |
| A6 | −2.644289E−02 | 1.781016E−01 | 3.771895E−01 | 9.286728E−02 | 3.504650E−01 | 7.924919E−01 |
| A8 | 3.943822E−02 | −6.861902E−01 | −1.084340E+00 | −4.726460E−01 | −1.490185E+00 | −1.764336E+00 |
| A10 | −1.385449E−01 | 7.855518E−01 | 9.727844E−01 | 4.292213E−01 | 3.925684E+00 | 2.396472E+00 |
| A12 | 6.988959E−02 | −2.999194E−01 | −3.505930E−02 | −2.830143E−01 | −6.316972E+00 | −2.026714E+00 |
| A14 | 0.000000E+00 | 0.000000E+00 | −2.746804E−01 | 5.118265E−02 | 4.983366E+00 | 1.018095E+00 |
| A16 | 0.000000E+00 | 0.000000E+00 | 0.000000E+00 | 0.000000E+00 | −1.454891E+00 | −2.192469E−01 |

| | Eighth Surface | Ninth Surface | Tenth Surface | Eleventh Surface | Twelfth Surface | Thirteenth Surface |
|---|---|---|---|---|---|---|
| k | 3.753925E+00 | −2.153271E+00 | 0.000000E+00 | 0.000000E+00 | −1.130225E−01 | −4.656659E+00 |
| A4 | −2.901919E−01 | −7.387318E−02 | 4.179289E−01 | 4.860263E−01 | −2.935323E−01 | −1.688829E−01 |
| A6 | 1.244420E+00 | 2.007362E−01 | −6.773879E−01 | −6.270723E−01 | 7.401988E−02 | 9.520621E−02 |
| A8 | −2.652794E+00 | −5.652746E−01 | 4.339063E−01 | 6.660278E−01 | 1.651119E−02 | −3.556737E−02 |
| A10 | 3.220000E+00 | 7.800175E−01 | −1.056884E−01 | −3.167299E−01 | −1.294745E−02 | 8.601007E−03 |
| A12 | −2.175872E+00 | −5.095599E−01 | 8.814944E−02 | 2.942200E−02 | −1.293221E−03 | |
| A14 | 7.707890E−01 | 1.624380E−01 | 1.609632E−02 | −1.311754E−02 | −3.120337E−04 | 1.086250E−04 |
| A16 | −1.126786E−01 | −2.065922E−02 | −2.035237E−03 | 8.023071E−04 | 1.313414E−05 | 3.862640E−05 |

The imaging lens in Example 2 satisfies conditional expressions (1) to (20) as shown in Table 9.

Figure 4:
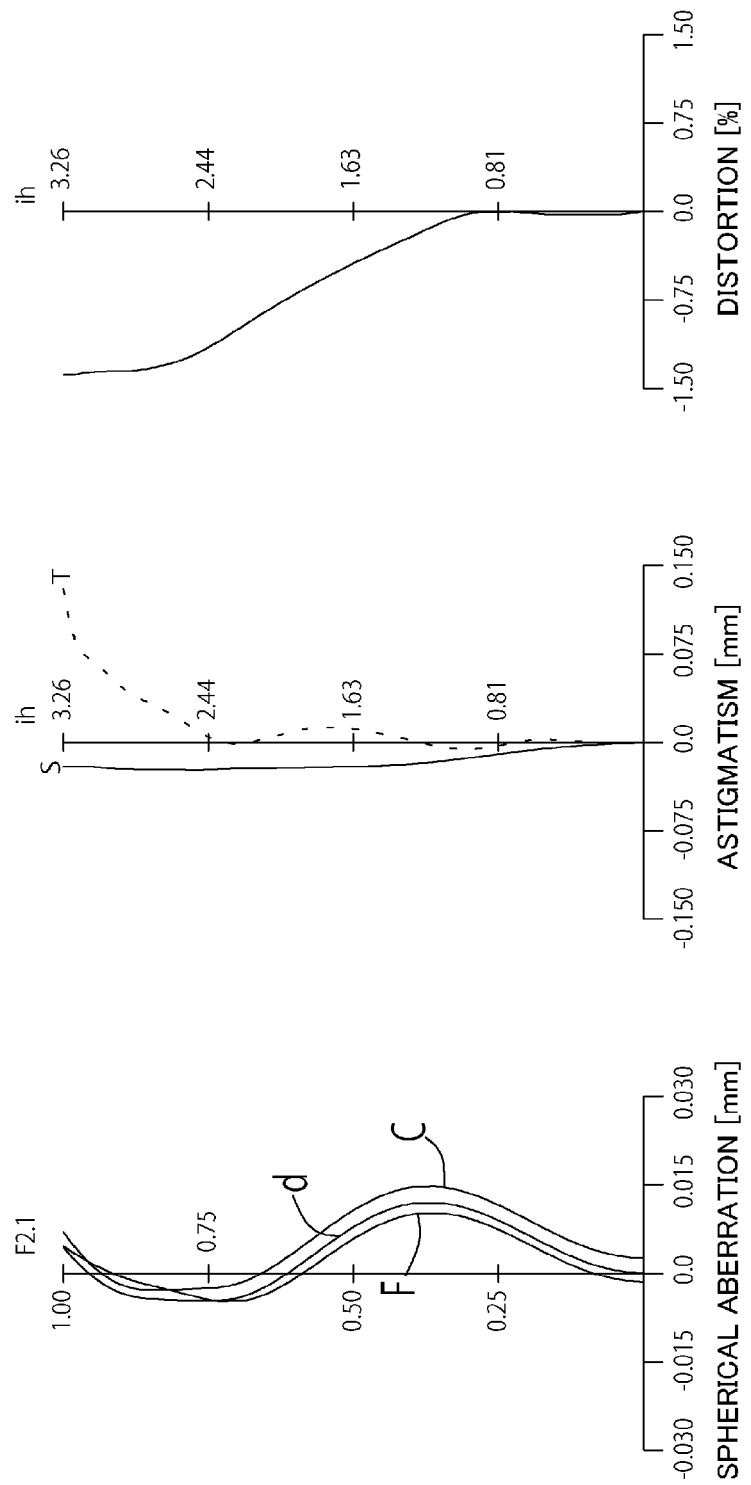
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected properly.

EXAMPLE 3

The basic lens data of Example 3 is shown below in Table 3.

Example 3

| | | | | |
|---|---|---|---|---|
| | | Unit mm | | |
| | | f = 3.21 | | |
| | | Fno = 1.8 | | |
| | | ω(°) = 41.9 | | |
| | | ih = 2.93 | | |
| | | TTL = 3.86 | | |

| Surface Data | | | | |
|---|---|---|---|---|
| Surface Number i | Curvature Radius r | Surface Distance d | Refractive Index Nd | Abbe Number υd |
| (Object) | Infinity | Infinity | | |
| 1 (Stop) | Infinity | −0.2460 | | |
| 2* | 1.2634 | 0.5440 | 1.544 | 55.86 (υd1) |
| 3* | 4.7675 | 0.0390 | | |
| 4* | 9.5107 | 0.2000 | 1.650 | 21.54 (υd2) |
| 5* | 3.8434 | 0.3030 | | |
| 6* | 6.9130 | 0.2800 | 1.650 | 21.54 (υd3) |
| 7* | 7.6347 | 0.2530 | | |
| 8* | −2.6207 | 0.5070 | 1.535 | 55.66 (υd4) |
| 9* | −1.0290 | 0.0200 | | |
| 10* | Infinity | 0.2800 | 1.638 | 23.25 (υd5) |
| 11* | Infinity | 0.1100 | | |
| 12* | 7.1752 | 0.3900 | 1.535 | 55.66 (υd6) |
| 13* | 1.0597 | 0.1540 | | |
| 14 | Infinity | 0.1100 | 1.535 | 55.66 |
| 15 | Infinity | 0.7107 | | |
| Image Plane | Infinity | | | |

| Constituent Lens Data | | | | |
|---|---|---|---|---|
| Lens | Start Surface | Focal Length | Composity Focal Length | |
| 1 | 2 | 2.994 | f12 | 3.879 |
| 2 | 4 | −10.058 | f345 | 2.835 |
| 3 | 6 | 97.538 | | |
| 4 | 8 | 2.851 | | |
| 5 | 10 | Infinity | Aperture Stop Diameter | |
| 6 | 12 | −2.378 | EPD | 1.740 |

| Aspheric Surface Data | | | | | | |
|---|---|---|---|---|---|---|
| | Second Surface | Third Surface | Fourth Surface | Fifth Surface | Sixth Surface | Seventh Surface |
| k | 0.000000E+00 | 0.000000E+00 | 0.000000E+00 | 1.247075E+01 | 0.000000E+00 | 0.000000E+00 |
| A4 | −4.719976E−02 | −4.654962E−01 | −4.447501E−01 | −1.387204E−01 | −3.045841E−01 | −2.078705E−01 |
| A6 | 2.685511E−01 | 5.796672E−01 | 1.163068E+00 | 1.039612E+00 | 1.606111E−01 | 2.442155E−01 |
| A8 | −1.290035E+00 | 5.552439E−01 | −1.269517E−02 | −2.084679E+00 | −1.157586E+00 | −1.591164E+00 |
| A10 | 2.755181E+00 | −3.076619E+00 | −3.211310E+00 | 4.006434E+00 | 2.779763E+00 | 4.074461E+00 |
| A12 | −3.218832E+00 | 3.564203E+00 | 4.814340E+00 | −5.395184E+00 | −3.620062E+00 | −5.932560E+00 |
| A14 | 1.319939E+00 | −1.400161E+00 | −2.103076E+00 | 3.821252E+00 | 2.071132E+00 | 4.674456E+00 |
| A16 | 0.000000E+00 | 0.000000E+00 | 0.000000E+00 | 0.000000E+00 | 0.000000E+00 | −1.437534E+00 |

| | Eighth Surface | Ninth Surface | Tenth Surface | Eleventh Surface | Twelfth Surface | Thirteenth Surface |
|---|---|---|---|---|---|---|
| k | 5.440382E−01 | −1.785906E+00 | 0.000000E+00 | 0.000000E+00 | 0.000000E+00 | −7.403855E+00 |
| A4 | 1.160103E−02 | 1.061712E−01 | 2.717704E−01 | 3.580299E−01 | −3.302613E−01 | −2.263507E−01 |
| A6 | 4.364384E−01 | −1.628076E−01 | −7.856513E−01 | −6.996522E−01 | 2.285391E−01 | 1.884938E−01 |
| A8 | −1.153811E+00 | −4.099292E−02 | 5.965268E−01 | 8.699100E−01 | −8.076020E−02 | −9.692812E−02 |
| A10 | 1.438991E+00 | 5.764117E−01 | −8.828936E−02 | −4.711544E−01 | 1.699127E−02 | 2.999546E−02 |
| A12 | −9.506630E−01 | −6.486668E−01 | −1.419775E−01 | 1.487869E−01 | −2.092488E−03 | −5.563597E−03 |
| A14 | 3.295908E−01 | 2.846578E−01 | 8.472099E−02 | −2.538796E−02 | 1.313916E−04 | 5.716976E−04 |
| A16 | −4.813181E−02 | −4.511563E−02 | −1.421625E−02 | 1.804916E−03 | −2.711931E−06 | −2.465423E−05 |

Figure 6:
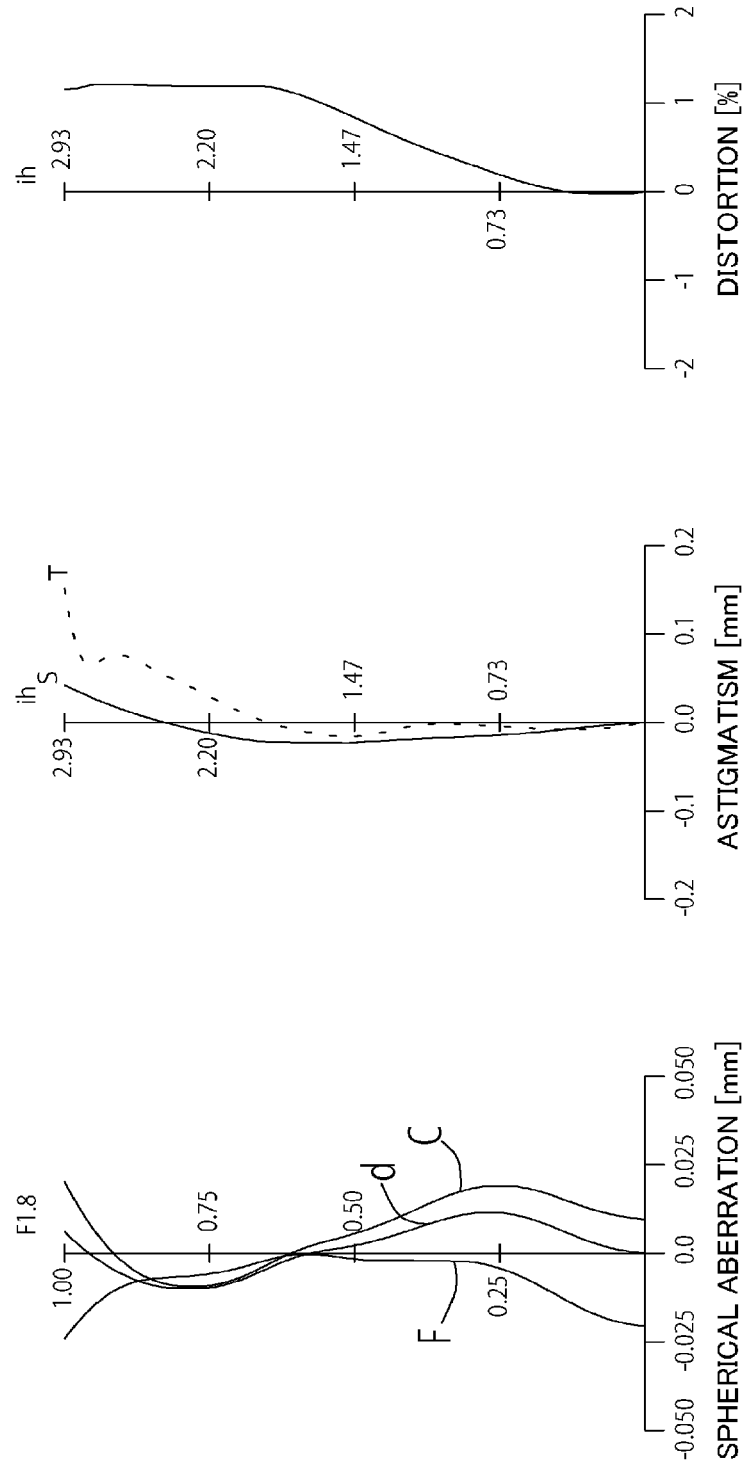
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected properly.

EXAMPLE 4

The basic lens data of Example 4 is shown below in Table 4.

Example 4

|  |  |
|---|---|
| Unit | mm |
| f = | 3.94 |
| Fno = | 2.3 |
| ω(°) = | 39.0 |
| ih = | 3.24 |
| TTL = | 4.53 |

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | −0.2677 | | |
| 2* | 1.5238 | 0.5870 | 1.544 | 55.86 (νd1) |
| 3* | 18.1544 | 0.0461 | | |
| 4* | 3.8561 | 0.2050 | 1.650 | 21.54 (νd2) |
| 5* | 1.8245 | 0.3089 | | |
| 6* | 16.0658 | 0.3722 | 1.650 | 21.54 (νd3) |
| 7* | 17.1882 | 0.2001 | | |
| 8* | −6.5231 | 0.4574 | 1.535 | 55.66 (νd4) |
| 9* | −2.2054 | 0.4976 | | |
| 10* | Infinity | 0.2803 | 1.650 | 21.54 (νd5) |
| 11* | Infinity | 0.1009 | | |
| 12* | 1.8717 | 0.4335 | 1.535 | 55.66 (νd6) |
| 13* | 0.9874 | 0.5000 | | |
| 14 | Infinity | 0.2100 | 1.535 | 55.66 |
| 15 | Infinity | 0.4025 | | |
| Image Plane | Infinity | | | |

Constituent Lens Data

| Lens | Start Surface | Focal Length | Composity Focal Length | |
|---|---|---|---|---|
| 1 | 2 | 3.018 | f12 | 5.187 |
| 2 | 4 | −5.542 | f345 | 5.967 |
| 3 | 6 | 334.569 | | |
| 4 | 8 | 6.008 | | |
| 5 | 10 | Infinity | Aperture Stop Diameter | |
| 6 | 12 | −4.713 | EPD | 1.750 |

Aspheric Surface Data

|  | Second Surface | Third Surface | Fourth Surface | Fifth Surface | Sixth Surface | Seventh Surface |
|---|---|---|---|---|---|---|
| k | 1.331929E−01 | 0.000000E+00 | 0.000000E+00 | −4.417535E+01 | −5.587153E+01 | 0.000000E+00 |
| A4 | −7.406893E−03 | −1.223079E−01 | −2.661013E−01 | −8.921235E−02 | −1.330128E−01 | −1.310891E−01 |
| A6 | 4.869860E−02 | 6.573795E−01 | 1.081374E+00 | 5.942282E−01 | −7.744220E−02 | 6.393981E−02 |
| A8 | −1.271009E−01 | −1.406402E+00 | −2.384345E+00 | −1.189847E+01 | 7.326895E−01 | −8.582862E−02 |
| A10 | 1.886037E−01 | 1.625268E+00 | 3.086008E+00 | 1.671301E+00 | −2.016916E+00 | 2.910997E−01 |
| A12 | −1.064687E−01 | −1.117391E+00 | −2.456565E+00 | −1.383115E+00 | 2.924332E+00 | −5.158262E−01 |
| A14 | 0.000000E+00 | 2.985026E−01 | 7.890511E−01 | 4.823689E−01 | −1.871009E+00 | 4.291705E−01 |
| A16 | 0.000000E+00 | 0.000000E+00 | 0.000000E+00 | 0.000000E+00 | 4.109490E−01 | −1.251168E−02 |

|  | Eighth Surface | Ninth Surface | Tenth Surface | Eleventh Surface | Twelfth Surface | Thirteenth Surface |
|---|---|---|---|---|---|---|
| k | 1.190808E+01 | −3.467282E−02 | 0.000000E+00 | 0.000000E+00 | −8.102644E−01 | −5.524100E+00 |
| A4 | −1.140316E−02 | −2.210608E−02 | 3.011473E−01 | 3.587274E−01 | −5.803562E−01 | −2.712977E−01 |
| A6 | −1.741907E−01 | −5.051655E−02 | −7.343900E−01 | −8.280315E−01 | 3.878251E−01 | 2.128997E−01 |
| A8 | 6.358653E−01 | 8.090235E−02 | 6.084051E−01 | 7.610212E−01 | −1.574270E−01 | −1.001997E−01 |
| A10 | −7.354409E−01 | 1.412040E−01 | −2.087890E−01 | −3.811159E−01 | 4.112961E−02 | 2.783579E−02 |
| A12 | 4.313780E−01 | −1.880276E−01 | −9.347526E−03 | 1.065052E−01 | −6.624586E−03 | −4.491767E−03 |
| A14 | −1.341600E−01 | 7.536115E−02 | 2.289223E−02 | −1.550940E−02 | 5.925350E−04 | 3.668473E−04 |
| A16 | 1.743705E−02 | −1.035489E−02 | −3.895511E−03 | 9.154615E−04 | −2.241043E−05 | −1.366423E−05 |

The imaging lens in Example 4 satisfies conditional expressions (1) to (20) as shown in Table 9.

Figure 8:
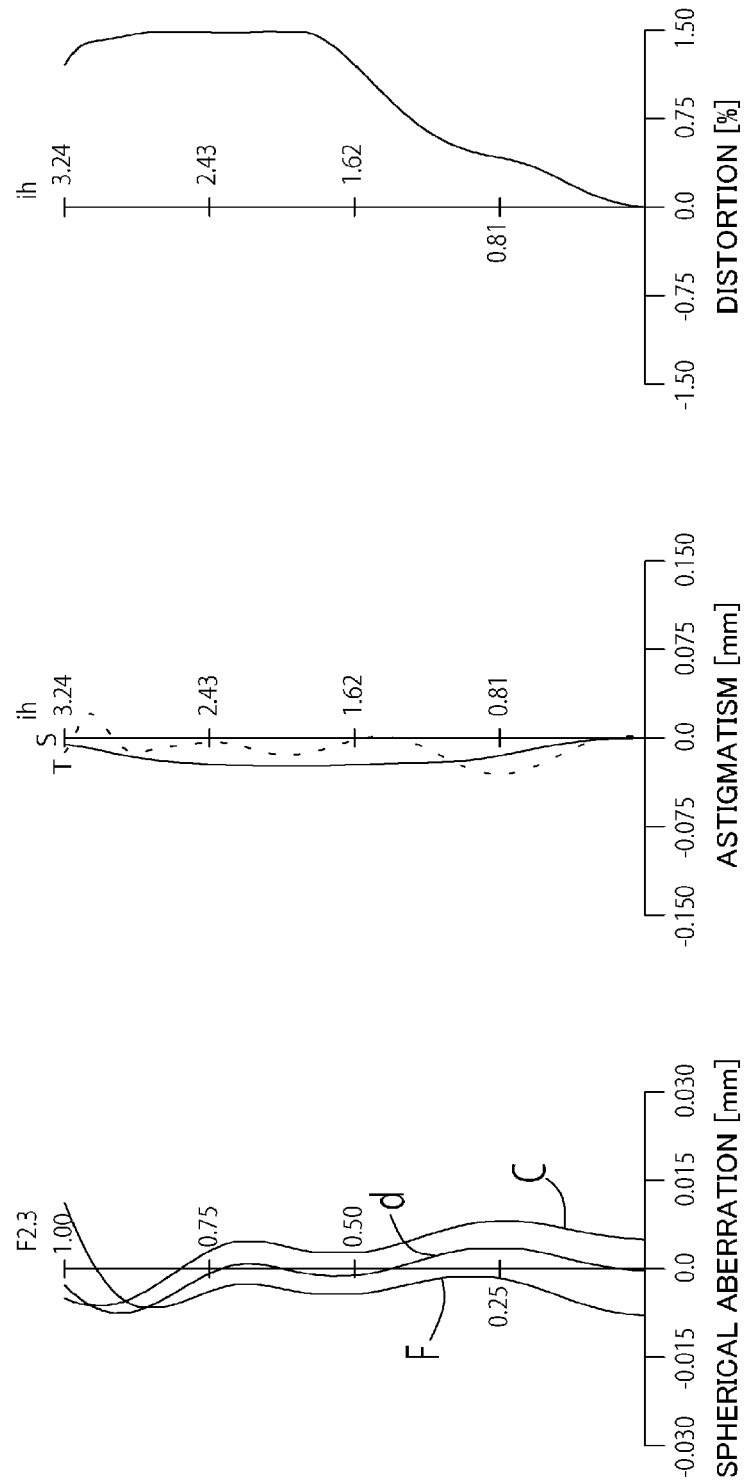
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected properly.

EXAMPLE 5

The basic lens data of Example 5 is shown below in Table 5.

Example 5

Unit mm
f = 3.99
Fno = 2.2
ω(°) = 39.0
ih = 3.24
TTL = 4.53

Surface Data

| Surface Number i | Curvature Radius r | Surface Distance d | Refractive Index Nd | Abbe Number υd |
|---|---|---|---|---|
| (Object) | Infinity | Infinity | | |
| 1 (Stop) | Infinity | −0.2785 | | |
| 2* | 1.3891 | 0.5917 | 1.544 | 55.86 (υd1) |
| 3* | 10.3138 | 0.0518 | | |
| 4* | −47.4168 | 0.2100 | 1.650 | 21.54 (υd2) |
| 5* | 5.0412 | 0.3507 | | |
| 6* | 9.2925 | 0.2571 | 1.650 | 21.54 (υd3) |
| 7* | 13.5530 | 0.2580 | | |
| 8* | −2.2371 | 0.4657 | 1.535 | 55.66 (υd4) |
| 9* | −1.7203 | 0.1110 | | |
| 10* | Infinity | 0.3339 | 1.650 | 21.54 (υd5) |
| 11* | Infinity | 0.1951 | | |
| 12* | 2.7535 | 0.5674 | 1.535 | 55.66 (υd6) |
| 13* | 1.3260 | 0.5000 | | |
| 14 | Infinity | 0.2100 | 1.535 | 55.66 |
| 15 | Infinity | 0.5006 | | |
| Image Plane | Infinity | | | |

Constituent Lens Data

| Lens | Start Surface | Focal Length | Composity Focal Length | |
|---|---|---|---|---|
| 1 | 2 | 2.882 | f12 | 4.276 |
| 2 | 4 | −6.996 | f345 | 8.835 |
| 3 | 6 | 44.398 | | |
| 4 | 8 | 10.597 | | |
| 5 | 10 | Infinity | Aperture Stop Diameter | |
| 6 | 12 | −5.551 | EPD | 1.780 |

Aspheric Surface Data

| | Second Surface | Third Surface | Fourth Surface | Fifth Surface | Sixth Surface | Seventh Surface |
|---|---|---|---|---|---|---|
| k | −1.967215E−03 | 0.000000E+00 | 0.000000E+00 | 9.185831E+00 | −2.261108E+01 | 0.000000E+00 |
| A4 | −1.230843E−02 | −1.492996E−01 | −1.096284E−01 | −2.076675E−02 | −2.749720E−01 | −2.349594E−01 |
| A6 | 5.316360E−02 | 1.755109E−01 | 4.521449E−01 | 5.239162E−01 | 5.317845E−01 | 4.240610E−01 |
| A8 | −2.070441E−01 | 5.469286E−02 | −3.273939E−01 | −1.172253E+00 | −2.772007E+00 | −1.630070E+00 |
| A10 | 2.846545E−01 | −4.001771E−01 | −2.444808E−02 | 2.191852E+00 | 7.686206E+00 | 3.513204E+00 |
| A12 | −2.062404E−01 | 1.660656E−01 | 7.727210E−02 | −2.343305E+00 | −1.253627E+01 | −4.552604E+00 |
| A14 | 0.000000E+00 | 4.978330E−00 | −6.390219E−02 | −1.260009E+00 | −1.086791E+01 | −3.247415E+00 |
| A16 | 0.000000E+00 | 0.000000E+00 | 0.000000E+00 | 0.000000E+00 | −3.610737E+00 | −9.116352E−01 |

| | Eighth Surface | Ninth Surface | Tenth Surface | Eleventh Surface | Twelfth Surface | Thirteenth Surface |
|---|---|---|---|---|---|---|
| k | 1.346033E+00 | 2.810815E−01 | 0.000000E+00 | 0.000000E+00 | −3.290207E−01 | −6.502101E+00 |
| A4 | −7.577301E−02 | −1.058170E−01 | 9.006051E−02 | 1.212194E−01 | −3.832958E−01 | −1.596048E−01 |
| A6 | 3.267860E−01 | 2.522699E−01 | −2.875967E−01 | −2.631611E−01 | 2.009147E−01 | 7.691617E−02 |
| A8 | −4.330790E−01 | −3.581994E−01 | 1.758500E−01 | 1.998612E−01 | −5.709034E−02 | −2.363937E−02 |
| A10 | 3.252264E−01 | 4.200004E−01 | −4.801363E−02 | −7.606610E−02 | 9.985321E−03 | 4.445327E−03 |
| A12 | −8.808337E−02 | −2.366092E−02 | 6.797910E−04 | 1.685584E−02 | −1.085040E−03 | −5.427541E−04 |
| A14 | 3.468094E−03 | 5.572865E−02 | 2.494055E−03 | −2.094392E−03 | 6.795963E−05 | 4.440794E−05 |
| A16 | −6.150255E−03 | −4.097313E−03 | −2.915291E−04 | 1.170872E−04 | −1.944248E−05 | −1.850052E−06 |

The imaging lens in Example 5 satisfies conditional expressions (1) to (20) as shown in Table 9.

Figure 10:
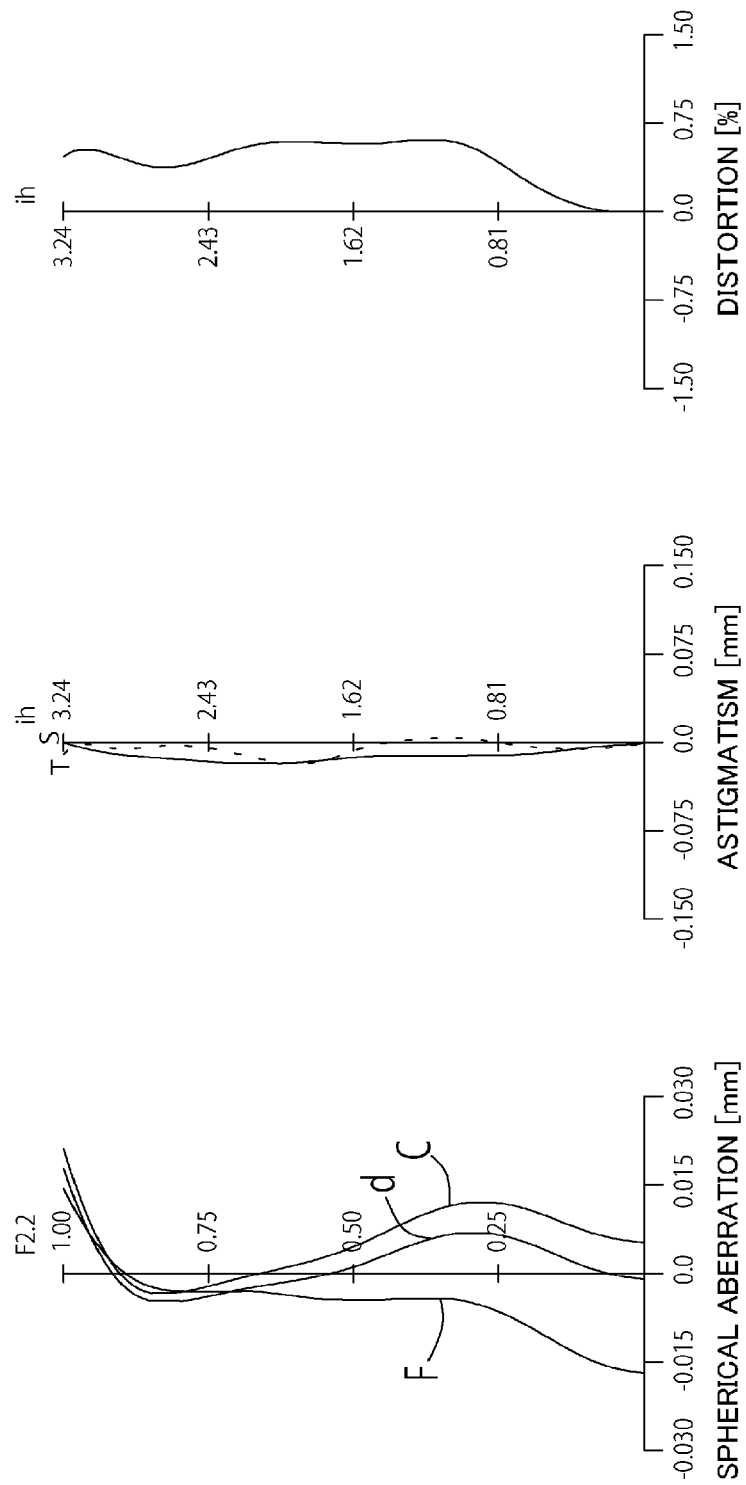
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected properly.

EXAMPLE 6

The basic lens data of Example 6 is shown below in Table 6.

Example 6

Unit mm
f = 4.52
Fno = 2.1
ω(°) = 39.2
ih = 3.74
TTL = 5.18

Surface Data

| Surface Number i | Curvature Radius r | Surface Distance d | Refractive Index Nd | Abbe Number υd |
|---|---|---|---|---|
| (Object) | Infinity | Infinity | | |
| 1 (Stop) | Infinity | −0.3930 | | |
| 2* | 1.5973 | 0.6860 | 1.544 | 55.86 (υd1) |
| 3* | 7.8452 | 0.0900 | | |
| 4* | −42.1442 | 0.2250 | 1.661 | 20.37 (υd2) |
| 5* | 7.2386 | 0.4110 | | |
| 6* | 13.7057 | 0.2900 | 1.661 | 20.37 (υd3) |
| 7* | 14.4391 | 0.4500 | | |
| 8* | −5.0391 | 0.5060 | 1.535 | 55.66 (υd4) |
| 9* | −2.6193 | 0.1950 | | |
| 10* | Infinity | 0.3910 | 1.614 | 25.58 (υd5) |
| 11* | Infinity | 0.2010 | | |
| 12* | 3.1799 | 0.6800 | 1.535 | 55.68 (υd6) |
| 13* | 1.4120 | 0.2060 | | |
| 14 | Infinity | 0.2100 | 1.535 | 55.66 |
| 15 | Infinity | 0.7142 | | |
| Image Plane | Infinity | | | |

Constituent Lens Data

| Lens | Start Surface | Focal Length | Composity Focal Length | |
|---|---|---|---|---|
| 1 | 2 | 3.551 | f12 | 5.079 |
| 2 | 4 | −9.333 | f345 | 9.362 |
| 3 | 6 | 352.871 | | |
| 4 | 8 | 9.506 | | |
| 5 | 10 | Infinity | Aperture Stop Diameter | |
| 6 | 12 | −5.484 | EPD | 2.180 |

Aspheric Surface Data

| | Second Surface | Third Surface | Fourth Surface | Fifth Surface | Sixth Surface | Seventh Surface |
|---|---|---|---|---|---|---|
| k | −8.691488E−02 | 0.000000E+00 | 0.000000E+00 | 7.166031E+00 | −3.313131E+00 | 0.000000E+00 |
| A4 | 2.900701E−04 | −5.590985E−02 | −3.174105E−02 | 2.242605E−03 | −1.562073E−01 | −1.258887E−01 |
| A6 | 1.767292E−02 | 3.731715E−02 | 1.128797E−01 | 1.838752E−01 | 1.749317E−01 | 1.080638E−01 |
| A8 | −4.280766E−02 | −2.695803E−02 | −3.168308E−02 | −2.832551E−01 | −7.270941E−01 | −3.290205E−01 |
| A10 | 4.429881E−02 | 2.424184E−02 | −3.370358E−02 | 4.392181E−01 | 1.569096E+00 | 5.304595E−01 |
| A12 | −2.299799E−02 | −2.401954E−02 | 4.835805E−02 | −3.832186E−01 | −1.950134E+00 | −4.832432E−01 |
| A14 | 0.000000E+00 | 6.655699E−03 | −1.260859E−02 | 1.620960E−01 | 1.288203E+00 | 2.419529E−01 |
| A16 | 0.000000E+00 | 0.000000E+00 | 0.000000E+00 | 0.000000E+00 | −3.421176E−01 | −4.898299E−02 |

| | Eighth Surface | Ninth Surface | Tenth Surface | Eleventh Surface | Twelfth Surface | Thirteenth Surface |
|---|---|---|---|---|---|---|
| k | 2.451555E+00 | −1.690391E−01 | 0.000000E+00 | 0.000000E+00 | −2.421334E−01 | −6.054585E+00 |
| A4 | −7.894266E−02 | −6.449782E−02 | 1.403757E−01 | 1.643637E−01 | −2.306327E−01 | −9.648951E−02 |
| A6 | 1.704029E−01 | 1.063921E−01 | −1.860364E−01 | −2.003133E−01 | 8.754783E−02 | 3.690136E−02 |
| A8 | −2.858814E−01 | −1.704048E−01 | 7.366284E−02 | 1.059090E−01 | −1.941708E−02 | −1.021706E−02 |
| A10 | 2.522628E−01 | 1.447889E−01 | −4.277695E−03 | −3.316423E−02 | 2.789525E−03 | 1.924614E−03 |
| A12 | −1.137403E−01 | −5.950988E−02 | −6.484707E−03 | 6.090484E−03 | −2.571735E−04 | −2.270378E−04 |
| A14 | 2.558375E−02 | 1.182025E−02 | 1.962869E−03 | −5.988586E−04 | 1.365128E−05 | 1.466564E−05 |
| A16 | −2.297868E−03 | −9.133721E−04 | −1.735741E−04 | 2.428580E−05 | −3.322408E−07 | −3.887795E−07 |

The imaging lens in Example 6 satisfies conditional expressions (1) to (20) as shown in Table 9.

Figure 12:
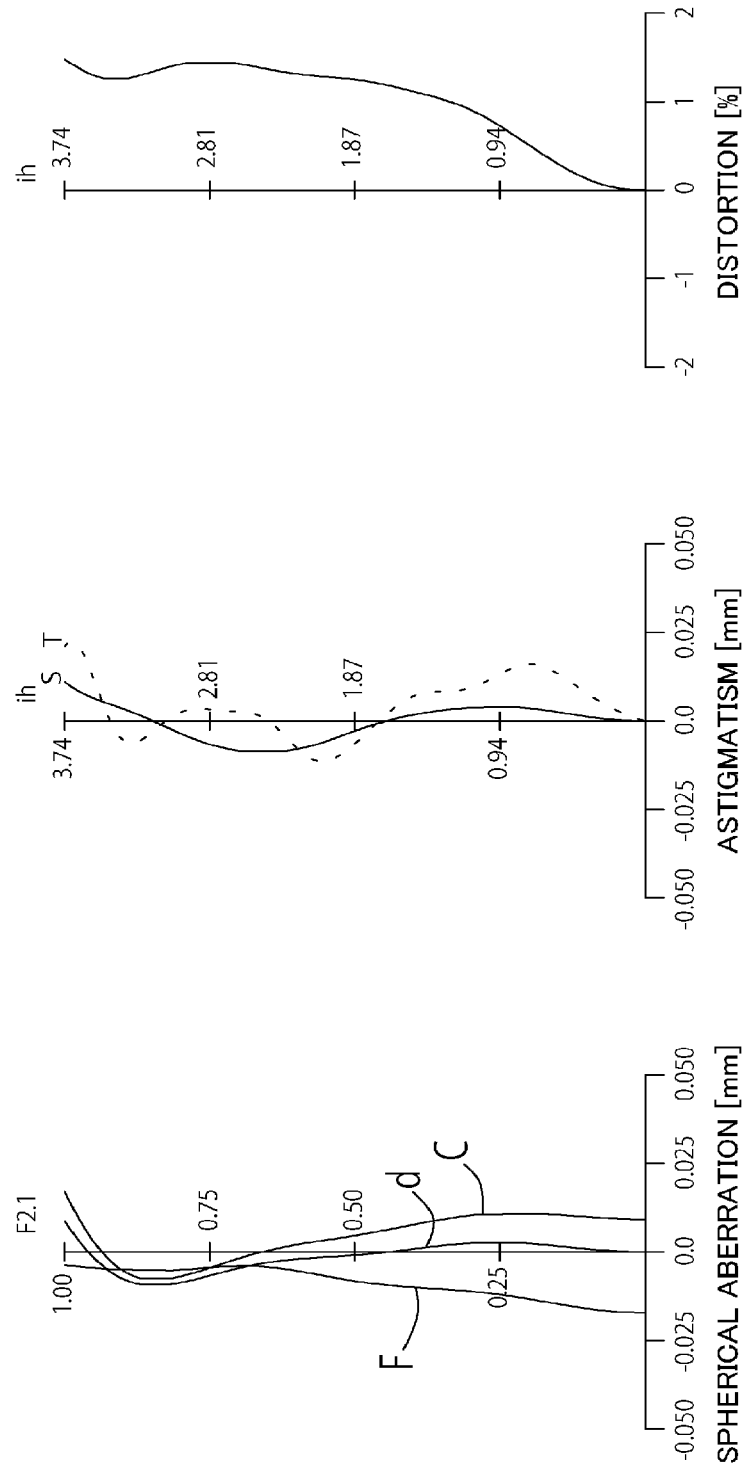
FIG. 12 shows spherical aberration, astigmatism, and distortion of the imaging lens in Example 6 according to the present invention.

FIG. 12 shows spherical aberration (mm), astigmatism (mm), and distortion (%) of the imaging lens in Example 6. As shown in FIG. 12, each aberration is corrected properly.

EXAMPLE 7

The basic lens data of Example 7 is shown below in Table 7.

Example 7

Unit mm
f = 4.26
Fno = 2.1
ω(°) = 45.1
ih = 3.88
TTL = 5.80

Surface Data

| Surface Number i | Curvature Radius r | Surface Distance d | Refractive Index Nd | Abbe Number υd |
|---|---|---|---|---|
| (Object) | Infinity | Infinity | | |
| 1 (Stop) | Infinity | −0.1020 | | |
| 2* | 3.2842 | 0.8180 | 1.544 | 55.86 (υd1) |
| 3* | −9.6583 | 0.0360 | | |
| 4* | 55.6585 | 0.2400 | 1.650 | 21.54 (υd2) |
| 5* | 7.5914 | 0.3640 | | |
| 6* | 5.4823 | 0.4200 | 1.650 | 21.54 (υd3) |
| 7* | 4.2160 | 0.1940 | | |
| 8* | −5.1126 | 0.8700 | 1.535 | 55.66 (υd4) |
| 9* | −1.5130 | 0.1190 | | |
| 10* | Infinity | 0.3750 | 1.614 | 25.58 (υd5) |
| 11* | Infinity | 0.2720 | | |
| 12* | 2.8088 | 0.5780 | 1.535 | 55.66 (υd6) |
| 13* | 1.1439 | 0.3640 | | |
| 14 | Infinity | 0.2100 | 1.517 | 64.20 |
| 15 | Infinity | 1.0102 | | |
| Image Plane | Infinity | | | |

Constituent Lens Data

| Lens | Start Surface | Focal Length | Composity Focal Length | |
|---|---|---|---|---|
| 1 | 2 | 4.605 | f12 | 6.533 |
| 2 | 4 | −13.543 | f345 | 4.192 |
| 3 | 6 | −32.286 | | |
| 4 | 8 | 3.706 | | |
| 5 | 10 | Infinity | Aperture Stop Diameter | |
| 6 | 12 | −4.105 | EPD | 2.055 |

Aspheric Surface Data

| | Second Surface | Third Surface | Fourth Surface | Fifth Surface | Sixth Surface | Seventh Surface |
|---|---|---|---|---|---|---|
| k | −2.108147E+00 | 0.000000E+00 | 0.000000E+00 | −6.929084E+01 | 1.045556E+01 | 0.000000E+00 |
| A4 | −1.968748E−02 | −1.658919E−01 | −1.464281E−01 | −6.309049E−02 | −1.924024E−01 | −1.355444E−01 |
| A6 | −7.173498E−03 | 3.537262E−01 | 4.144379E−01 | 1.400010E−01 | 1.570926E−01 | 1.450521E−01 |
| A8 | −9.544655E−03 | 5.351713E−01 | −5.304870E−01 | −1.275706E−01 | −4.914867E−01 | −2.649565E−01 |
| A10 | 5.074878E−03 | 3.661307E−01 | 2.074254E−01 | −4.069779E−02 | 8.935688E−01 | 2.744884E−01 |
| A12 | −3.433577E−03 | −9.670061E−02 | 6.225683E−02 | 7.295884E−02 | −9.030658E−01 | −1.639022E−01 |
| A14 | 0.000000E+00 | 4.978330E−00 | −5.342522E−02 | −2.286493E−02 | 4.589625E−01 | 5.470187E−02 |
| A16 | 0.000000E+00 | 0.000000E+00 | 0.000000E+00 | 0.000000E+00 | −9.007752E−02 | −7.614422E−03 |

| | Eighth Surface | Ninth Surface | Tenth Surface | Eleventh Surface | Twelfth Surface | Thirteenth Surface |
|---|---|---|---|---|---|---|
| k | −3.892236E+00 | −1.938466E+00 | 0.000000E+00 | 0.000000E+00 | −2.914147E−01 | −4.427122E+00 |
| A4 | −6.065542E−02 | −3.946559E−02 | 1.706918E−01 | 2.424001E−01 | −1.350359E−01 | −7.135910E−02 |
| A6 | 2.657478E−01 | 8.078422E−02 | −1.614523E−01 | −2.537293E−01 | 2.311406E−02 | 2.072399E−02 |
| A8 | −4.106977E−01 | −1.175648E−01 | 4.207507E−02 | 1.223533E−01 | −3.826427E−03 | −3.647396E−03 |
| A10 | 3.249729E−01 | 8.819294E−02 | 9.213148E−03 | −3.370540E−02 | 1.336893E−03 | 2.992617E−04 |
| A12 | −1.386872E−01 | −3.343953E−02 | 8.020499E−03 | 5.332736E−03 | −2.767996E−03 | −7.231990E−07 |
| A14 | 3.099866E−02 | 6.446302E−03 | 1.681096E−03 | −4.474849E−04 | 2.574756E−05 | −1.462691E−06 |
| A16 | −2.866353E−03 | −5.056244E−04 | −1.169896E−04 | 1.538052E−05 | −8.930800E−07 | 6.654238E−08 |

The imaging lens in Example 7 satisfies conditional expressions (1) to (20) as shown in Table 9.

Figure 14:
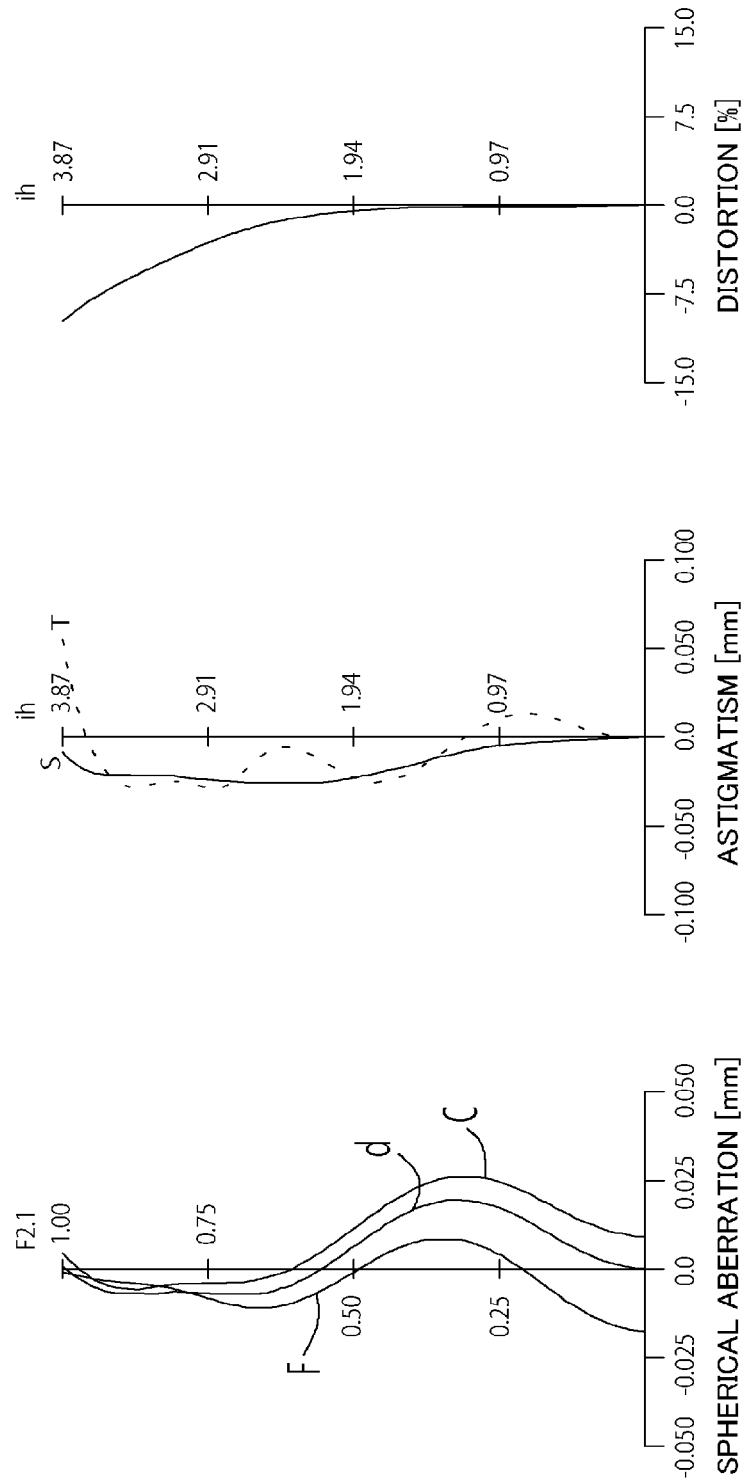
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7. As shown in FIG. 14, each aberration is corrected properly.

EXAMPLE 8

The basic lens data of Example 8 is shown below in Table 8.

Example 8

Unit mm
$f = 3.84$
$Fno = 2.1$
$\omega(°) = 45.3$
$ih = 3.88$
$TTL = 5.22$

Surface Data

| Surface Number i | Curvature Radius r | Surface Distance d | Refractive Index Nd | Abbe Number $\nu d$ |
|---|---|---|---|---|
| (Object) | Infinity | Infinity | | |
| 1 (Stop) | Infinity | −0.1000 | | |
| 2* | 2.8409 | 0.6910 | 1.544 | 55.86 ($\nu d1$) |
| 3* | −17.2158 | 0.0560 | | |
| 4* | 44.0765 | 0.2250 | 1.650 | 21.54 ($\nu d2$) |
| 5* | 6.8936 | 0.2970 | | |
| 6* | 4.5807 | 0.3310 | 1.650 | 21.54 ($\nu d3$) |
| 7* | 3.5173 | 0.1750 | | |
| 8* | −8.3192 | 0.8000 | 1.535 | 55.66 ($\nu d4$) |
| 9* | −1.5627 | 0.1320 | | |
| 10* | Infinity | 0.3300 | 1.614 | 25.58 ($\nu d5$) |
| 11* | Infinity | 0.3340 | | |
| 12* | 2.4548 | 0.5650 | 1.535 | 55.66 ($\nu d6$) |
| 13* | 1.0682 | 0.3270 | | |
| 14 | Infinity | 0.2100 | 1.517 | 64.20 |
| 15 | Infinity | 0.8221 | | |
| Image Plane | Infinity | | | |

Constituent Lens Data

| Lens | Start Surface | Focal Length | Composity Focal Length | |
|---|---|---|---|---|
| 1 | 2 | 4.535 | f12 | 6.591 |
| 2 | 4 | −12.595 | f345 | 3.966 |
| 3 | 6 | −26.554 | | |
| 4 | 8 | 3.455 | | |
| 5 | 10 | Infinity | Aperture Stop Diameter | |
| 6 | 12 | −4.121 | EPD | 1.850 |

Aspheric Surface Data

| | Second Surface | Third Surface | Fourth Surface | Fifth Surface | Sixth Surface | Seventh Surface |
|---|---|---|---|---|---|---|
| k | −1.437286E+00 | 0.000000E+00 | 0.000000E+00 | −4.848042E+01 | 8.714659E+00 | 0.000000E+00 |
| A4 | −2.627057E−02 | −2.257769E−01 | −2.193977E−01 | −1.246235E−01 | −2.952648E−01 | −2.383081E−01 |
| A6 | −1.105853E−02 | 5.248531E−01 | 7.164687E−01 | 3.896261E−01 | 3.801777E−01 | 3.852884E−01 |
| A8 | −1.662789E−02 | −9.035983E−01 | −1.084162E+00 | −6.075037E−01 | −1.237578E+00 | −7.601375E−01 |
| A10 | 6.941113E−03 | 7.250968E−01 | 5.914885E−01 | 4.099276E−01 | 2.397695E+00 | 9.266348E−01 |
| A12 | −6.162873E−03 | −2.303129E−01 | 7.631372E−02 | −1.679003E−01 | −2.663415E+00 | −6.996166E−01 |
| A14 | 0.000000E+00 | 0.000000E+00 | −1.563580E−01 | 2.660693E−01 | 1.520509E+00 | 3.017107E−01 |
| A16 | 0.000000E+00 | 0.000000E+00 | 0.000000E+00 | 0.000000E+00 | −3.388557E−01 | −5.404776E−02 |

| | Eighth Surface | Ninth Surface | Tenth Surface | Eleventh Surface | Twelfth Surface | Thirteenth Surface |
|---|---|---|---|---|---|---|
| k | 1.889818E+01 | −1.716310E+00 | 0.000000E+00 | 0.000000E+00 | −2.790310E−01 | −4.034280E+00 |
| A4 | −1.414744E−01 | −7.959182E−02 | 2.697440E−01 | 3.588678E−01 | −1.870126E−01 | −1.054381E−01 |
| A6 | 4.835080E−01 | 1.887608E−01 | −2.391135E−01 | −3.689691E−01 | 4.169125E−02 | 4.272189E−02 |
| A8 | −6.558512E−01 | −2.605494E−01 | 7.376445E−02 | 1.915278E−01 | −8.120134E−03 | −1.477106E−02 |
| A10 | 4.613604E−01 | 2.066037E−01 | 1.627236E−03 | −6.216931E−02 | 3.164097E−03 | 3.697161E−03 |
| A12 | −1.790764E−01 | −9.171501E−02 | −8.765424E−03 | 1.230582E−02 | −8.042506E−04 | −5.654726E−04 |
| A14 | 3.828896E−02 | 2.131199E−02 | 2.422761E−03 | −1.331186E−03 | 9.358626E−05 | 4.600857E−05 |
| A16 | −3.709118E−03 | −1.946429E−03 | −2.085078E−04 | 5.975778E−05 | −4.085893E−06 | −1.514257E−06 |

The imaging lens in Example 8 satisfies conditional expressions (2) to (20) as shown in Table 9.

Figure 16:
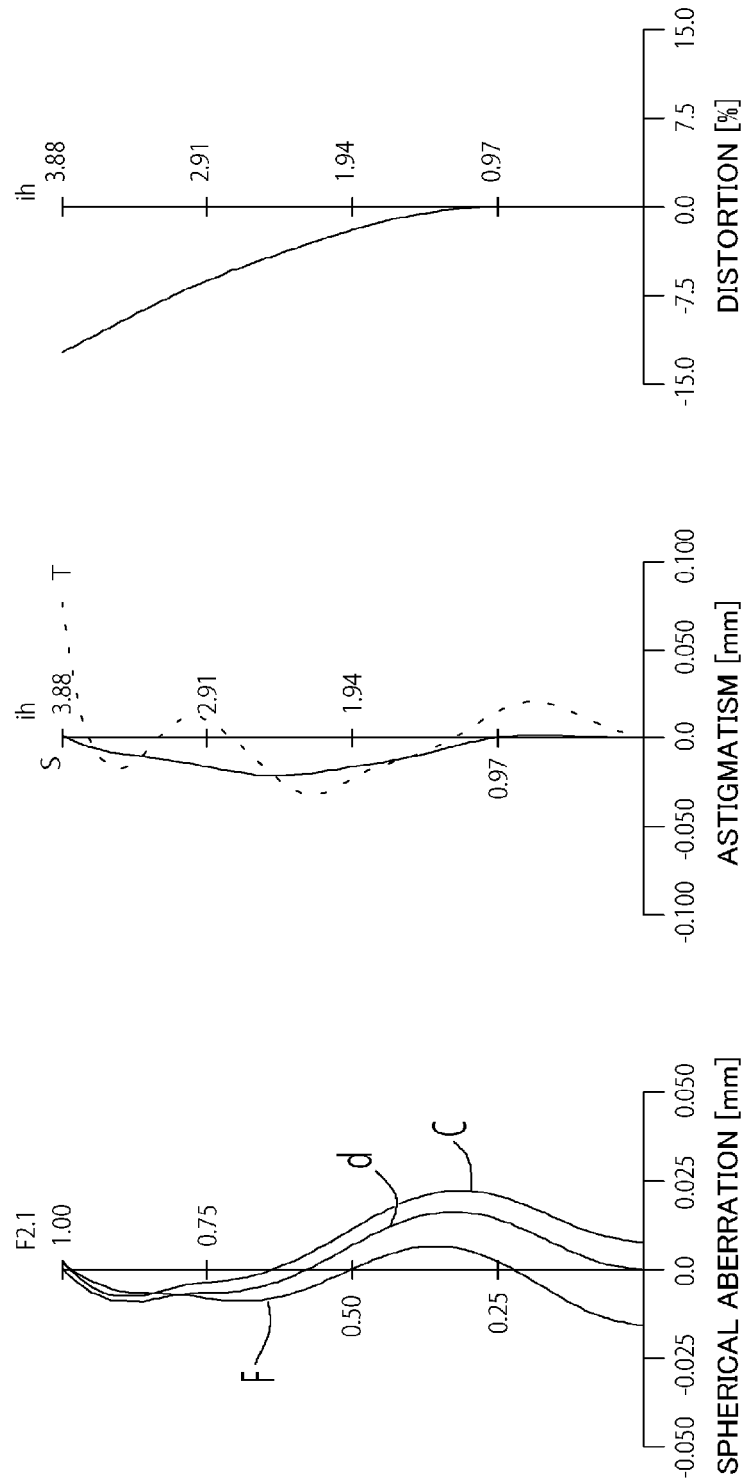
FIG. 16 shows spherical aberration, astigmatism, and distortion of the imaging lens in Example 8 according to the present invention.

FIG. 16 shows spherical aberration (mm), astigmatism (mm), and distortion (%) of the imaging lens in Example 8. As shown in FIG. 16, each aberration is corrected properly.

The imaging lens according to the present embodiments, as shown in the below, realizes the low-profileness, the wide field of view and the low F-value.

|  | Ratio of total track length to diagonal length | field of view | F-number |
|---|---|---|---|
| Example 1 | 0.69 | 90.0 | 2.0 |
| Example 2 | 0.69 | 89.0 | 2.1 |
| Example 3 | 0.66 | 83.8 | 1.8 |
| Example 4 | 0.70 | 78.0 | 2.3 |
| Example 5 | 0.70 | 88.0 | 2.2 |
| Example 6 | 0.69 | 78.4 | 2.1 |
| Example 7 | 0.75 | 90.2 | 2.1 |
| Example 8 | 0.67 | 90.6 | 2.1 |

TABLE 9 shows values of the conditional expressions (1) to (20) relating to Examples 1 to 7.

| Conditional Expression | Example 1 | Example 2 | Example 3 | Example 4 | Example 5 | Example 6 | Example 7 | Example 8 |
|---|---|---|---|---|---|---|---|---|
| (a) f12/f | 1.40 | 1.28 | 1.21 | 1.32 | 1.07 | 1.12 | 1.53 | 1.72 |
| (b) f345/f | 0.95 | 1.03 | 0.88 | 1.51 | 2.22 | 2.07 | 0.98 | 1.03 |
| (c) f12/f345 | 1.48 | 1.25 | 1.37 | 0.87 | 0.48 | 0.54 | 1.56 | 1.66 |
| (1) D56/D23 | 0.24 | 0.65 | 0.36 | 0.33 | 0.56 | 0.49 | 0.75 | 1.12 |
| (2) υd3 | 21.54 | 21.54 | 21.54 | 21.54 | 21.54 | 20.37 | 21.54 | 21.54 |
| (3) υd6 | 21.54 | 25.58 | 23.25 | 21.54 | 21.54 | 25.58 | 25.58 | 25.58 |
| (4) υd1/(υd2 + υd3) | 1.30 | 1.30 | 1.30 | 1.30 | 1.30 | 1.37 | 1.30 | 1.30 |
| (5) υd4/υd5 | 2.58 | 2.18 | 2.39 | 2.58 | 2.58 | 2.18 | 2.18 | 2.18 |
| (6) D6/ΣD | 0.21 | 0.18 | 0.18 | 0.19 | 0.23 | 0.24 | 0.18 | 0.19 |
| (7) $\Sigma_{L1F-L6R}$/f | 1.03 | 1.01 | 0.91 | 0.88 | 0.85 | 0.91 | 1.00 | 1.03 |
| (8) |r3|/f | 2.51 | 5.17 | 2.96 | 0.98 | 11.89 | 9.33 | 13.02 | 11.48 |
| (9) r4/f | 1.15 | 1.26 | 1.20 | 0.46 | 1.26 | 1.60 | 1.78 | 1.80 |
| (10) |r11|/f | 0.88 | 0.77 | 2.24 | 0.47 | 0.69 | 0.70 | 0.66 | 0.64 |
| (11) r12/f | 0.30 | 0.28 | 0.33 | 0.25 | 0.33 | 0.31 | 0.27 | 0.28 |
| (12) D34/D23 | 0.46 | 0.30 | 0.83 | 0.65 | 0.74 | 1.09 | 0.53 | 0.59 |
| (13) f1/f | 1.04 | 0.91 | 0.93 | 0.77 | 0.72 | 0.79 | 1.08 | 1.18 |
| (14) f4/f | 0.88 | 0.80 | 0.89 | 1.52 | 2.66 | 2.10 | 0.87 | 0.90 |
| (15) f2/f | −3.34 | −2.58 | −3.13 | −1.41 | −1.75 | −2.07 | −3.17 | −3.28 |
| (16) f6/f | −0.93 | −0.94 | −0.74 | −1.19 | −1.39 | −1.21 | −0.96 | −1.07 |
| (17) |f2| > |f6| | YES | YES | YES | YES | YES | YES | YES | YES |
| (18) |f3|/f | 14.39 | 2.78 | 30.38 | 84.83 | 11.13 | 78.08 | 7.55 | 6.92 |
| (19) $\Sigma_{L1F-L6R}$/EPD | 2.00 | 2.09 | 1.68 | 1.99 | 1.91 | 1.89 | 2.09 | 2.13 |
| (20) D56/D6 | 0.15 | 0.43 | 0.28 | 0.23 | 0.34 | 0.30 | 0.47 | 0.59 |

When the imaging lens according to the present invention is applied to products with the camera function is, it may contribute to the low-profileness, the wide field of view, and the low F-value of the camera, higher performance of the same is ensured.

DESCRIPTION OF REFERENCE NUMERALS

ST: an aperture stop,
L1: first lens,
L2: second lens,
L3: third lens,
L4: fourth lens,
L5: fifth lens,
L6: sixth lens,
IR: filter,
IMG: imaging plane

What is claimed is:
1. An imaging lens comprising in order from an object side to an image side:
a first lens having positive refractive power with a convex surface facing the object side proximate to an optical axis;
a second lens having negative refractive power;
a third lens, which is a double-sided aspheric lens;
a fourth lens having a meniscus shape with a concave surface facing the object side proximate to the optical axis;
a fifth lens, which is a double-sided aspheric lens; and
a sixth lens, which is a double-sided aspheric lens, the sixth lens having negative refractive power with a concave surface facing the image side proximate to the optical axis, and
further comprising an aperture stop, wherein a total track length is 6.0 mm or less and below conditional expressions (1'), (4), (5), and (12) are satisfied:

$$0.33 \leq D56/D23 < 0.8 \quad (1')$$

$$0.9 < vd1/(vd2+vd3) < 1.4 \quad (4)$$

$$1.8 < vd4/vd5 < 2.8 \quad (5)$$

$$0.1 < D34/D23 < 1.5 \quad (12)$$

where:
D23: distance along the optical axis from an image-side surface of the second lens to an object-side surface of the third lens,
D34: distance along the optical axis from an image-side surface of the third lens to the concave surface of the fourth lens,
D56: distance along the optical axis from an image-side surface of the fifth lens to an object-side surface of the sixth lens, vd1: abbe number at d-ray of the first lens,
vd2: abbe number at d-ray of the second lens,
vd3: abbe number at d-ray of the third lens,
vd4: abbe number at d-ray of the fourth lens, and
vd5: abbe number at d-ray of the fifth lens.

2. The imaging lens according to claim 1, wherein a below conditional expression (2) is satisfied:

$$20<vvd3<32 \qquad (2)$$

where vd3: abbe number at d-ray of the third lens.

3. The imaging lens according to claim 1, wherein a below conditional expression (6) is satisfied:

$$0.1<D6/\Sigma D<0.35 \qquad (6)$$

where

D6: thickness on the optical axis of the sixth lens, and

ΣD: a total sum of thickness on the optical axis of each of the first lens, the second lens, the third lens, the fourth lens, the fifth lens, and the sixth lens.

4. The imaging lens according to claim 1, wherein a below conditional expression (7) is satisfied:

$$0.6<\Sigma_{L1F-L6R}/f<1.2 \qquad (7)$$

where $\Sigma_{L1F-L6R}$: distance along the optical axis from the convex surface of the first lens to the concave surface of the sixth lens, and f: focal length of an overall optical system of the imaging lens.

5. The imaging lens according to claim 1, wherein the third lens is a meniscus lens having a convex surface facing the object side proximate to the optical axis.

6. The imaging lens according to claim 1, wherein a below conditional expression (8) is satisfied:

$$0.8<|r3|/f<15.0 \qquad (8)$$

where r3: curvature radius proximate to the optical axis of the object-side surface of the second lens, and f: focal length of an overall optical system of the imaging lens.

7. The imaging lens according to claim 1, wherein the fifth lens has no substantial refractive power proximate to the optical axis.

8. The imaging lens according to claim 1, wherein a below conditional expression (9) is satisfied:

$$0.4<r4/f<2.8 \qquad (9)$$

where r4: curvature radius proximate to the optical axis of the image-side surface of the second lens, and f: focal length of an overall optical system of the imaging lens.

9. The imaging lens according to claim 1, wherein below conditional expressions (10) and (11) are satisfied:

$$0.4<|r11|/f<2.5 \qquad (10)$$

$$0.1<r12/f<0.5 \qquad (11)$$

where r11: curvature radius proximate to the optical axis of the object-side surface of the sixth lens, r12: curvature radius proximate to the optical axis of the concave surface of the sixth lens, and f: focal length of an overall optical system of the imaging lens.

10. The imaging lens according to claim 1, wherein below conditional expressions (13) and (14) are satisfied:

$$0.5<f1/f<1.5 \qquad (13)$$

$$0.5<f4/f<4.0 \qquad (14)$$

where f1: focal length of the first lens, f4: focal length of the fourth lens, and f: focal length of an overall optical system of the imaging lens.

11. The imaging lens according to claim 1, wherein below conditional expressions (15), (16) and (17) are satisfied:

$$-0.4<f2/f<-1.0 \qquad (15)$$

$$-2.0<f6/f<-0.5 \qquad (16)$$

$$|f2|>|f6| \qquad (17)$$

where f2: focal length of the second lens, f6: focal length of the sixth lens, and f: focal length of an overall optical system of the imaging lens.

12. The imaging lens according to claim 1, wherein a below conditional expression (18) is satisfied:

$$2.0<|f3|/f \qquad (18)$$

where f3: focal length of the third lens, and f: focal length of an overall optical system of the imaging lens.

13. The imaging lens according to claim 1, wherein a below conditional expression (19) is satisfied:

$$1.5<\Sigma_{L1F-L6R}/EPD<2.15 \qquad (19)$$

where $\Sigma_{L1F-L6R}$: distance along the optical axis from the convex surface of the first lens to the concave surface of the sixth lens, and EPD: diameter of the aperture stop.

* * * * *